United States Patent
Hatase et al.

(10) Patent No.: US 7,714,045 B2
(45) Date of Patent: May 11, 2010

(54) COLORED THERMOPLASTIC RESIN COMPOSITIONS FOR LASER WELDING, ANTHRAQUINONE COLORANTS THEREFOR AND MOLDED PRODUCT THERFROM

(75) Inventors: Yoshiteru Hatase, Osaka (JP); Reiko Koshida, Tochigi (JP); Hiroyuki Sumi, Tochigi-Ken (JP); Ryuichi Hayashi, Tokyo (JP)

(73) Assignees: E.I. du Pont de Nemours and Company, Wilmington, DE (US); Orient Chemical Industries Ltd, Osaka (JP)

( * ) Notice: Subject to any disclaimer, the term of this patent is extended or adjusted under 35 U.S.C. 154(b) by 849 days.

(21) Appl. No.: 11/327,712

(22) Filed: Jan. 6, 2006

(65) Prior Publication Data

US 2007/0161730 A1     Jul. 12, 2007

(51) Int. Cl.
   *C08K 5/34*         (2006.01)
   *C08K 5/3492*     (2006.01)
   *C08K 5/08*         (2006.01)
   *C08G 65/26*      (2006.01)

(52) U.S. Cl. .................. 524/90; 524/100; 524/242; 524/358; 428/524; 428/704

(58) Field of Classification Search .............. 524/90, 524/100, 242, 358; 428/524, 704
See application file for complete search history.

(56) References Cited

U.S. PATENT DOCUMENTS

| | | | |
|---|---|---|---|
| 4,102,639 A | 7/1978 | Zenhausem | |
| 4,775,012 A | 10/1988 | Thompson | |
| 5,663,029 A | 9/1997 | Malhotra | |
| 5,893,959 A | 4/1999 | Muellich | |
| 5,973,038 A | 10/1999 | Weaver | |
| 2003/0045618 A1* | 3/2003 | Koshida et al. | 524/358 |
| 2003/0068497 A1* | 4/2003 | Koshida et al. | 428/411.1 |

FOREIGN PATENT DOCUMENTS

WO     WO 0238664     *    4/2002

* cited by examiner

Primary Examiner—Kriellion A Sanders

(57) ABSTRACT

Thermoplastic resin compositions suitable for laser welding are described in which black colorants are added. These colorants constitute amine salt of anthraquinone dyes. Additional dyes, coloring agents, and a variety of other materials may be added. These compositions demonstrate outstanding mechanical and chemical properties once laser-welded.

5 Claims, 2 Drawing Sheets

COLORED THERMOPLASTIC RESIN COMPOSITIONS FOR LASER WELDING, ANTHRAQUINONE COLORANTS THEREFOR AND MOLDED PRODUCT THERFROM

This application claims the benefit of U.S. Provisional Application No. 60/247,937, filed Nov. 13, 2000, U.S. application Ser. No. 10/047,731, filed Nov. 13, 2001.

FIELD OF THE INVENTION

The instant invention relates to thermoplastic resin compositions containing black colorants and suitable for laser welding. More particularly, the invention relates to such compositions having improved laser weldability and mechanical properties.

BACKGROUND OF THE INVENTION

It is known in the art to join together two articles made of resins (and respectively opaque and transparent) by positioning them in contact with each other, transmitting a predetermined amount of laser beam focused on the junction of them and causing the junction portion to be melted and joined together ("laser welding"). Several advantages flow from laser welding versus conventional methods of joining plastic parts. For example, laser welding is widely known for its simple operation, labor savings, improvement of productivity, clear joints, and reduction of production cost. It is useful in various applications including the preparation of molded articles, including hollow shapes, in automobile industries and electric and electronic industries. Recently, work has intensified in the area of blends of thermoplastic resin and a colorant containing an organic dye or pigment. Better control of the conversion of laser energy to heat is achieved by the addition of such colorants to the resins. Laser beams penetrate through transparent articles positioned closer to the laser beam source, and are largely absorbed in the opaque article, which has a relatively higher absorption coefficient in comparison with the aforementioned transparent article. Careful attention to the amount of the colorants therein results in the junction portion being melted and the articles joined together.

See for example Japanese Published (Koukoku) Patent No. 62-49850 and Japanese Published (Koukoku) Patent No. 5 (93)-42336. Other resin compositions associated with the laser welding are described in U.S. Pat. No. 5,893,959 which discloses transparent and opaque workpiece parts welded together by a laser beam along a joining zone. Both parts contain black dye pigments such as carbon black to cause them to offer a substantially homogenous visual impression even after welding.

Other illustrations of the laser welding of compositions are found in U.S. Pat. No. 5,893,959. For example, the color of the thermoplastic components may be black (carbon black or nigrosine) which is commonly and widely used in the automobile industry among other applications. However, carbon black and nigrosine cannot transmit a laser beam with a main wavelength in the infra-red region (1200 nm to 800 nm), such as Nd:YAG laser and a diode laser, both of which are of wide use in industries.

Surprisingly, it has now been found that thermoplastic resin compositions both black in appearance can be used for laser-welded molded articles for both the transparent and opaque parts subjected to the laser beam. A significantly improved transmission to near-infrared light of the laser beam, with excellent and balanced heat-resistance and mechanical properties as required in automobile applications, is achieved by including a specific weight percentage of black dyes comprising amine salt of anthraquinone dyes.

Using these components, thermoplastic resin compositions can be utilized for laser welding and exhibiting improvements in moldability, solubility in the thermoplastic resin, bleeding- and blooming-resistance as well as transparency to the wavelength of a laser beam and resistance to chemicals.

SUMMARY OF THE INVENTION

There is disclosed and claimed herein thermoplastic resin compositions for laser welding comprising thermoplastic resin and laser-transmitting black colorant comprising amine salt of anthraquinone dye. More particularly, this black colorant comprises amine salt of anthraquinone dyes of formula [I], or formula [II], wherein Formula [I] is:

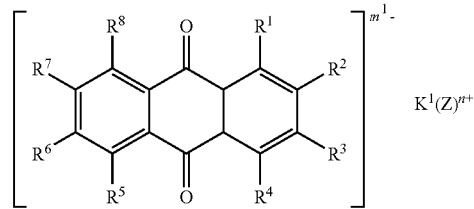

wherein $R^1$ to $R^8$, which may be the same or different, are independently selected from the group consisting of H, alkyl, aryl, alkenyl, alkoxy, amino, hydroxy, halogen atom, acyl, acyloxy, acylamide, acyl-N-alkylamide, carboxyl, alkoxycarbonyl, cyclohexylamide, sulfonyl, formula [I-a], or —Y—W; and at least one of $R^1$ to $R^8$ is of formula [I-a]; wherein Y is S, O, or NH, and W is selected from unsubstituted or substituted alkyl group, alkenyl group, and unsubstituted or substituted aryl group, wherein $(Z)^{n+}$ represents ammonium ion or a cation derived from an organic amine compounds or a basic dye wherein n is 1 or 2, $m^1$ is an integer from 1 to 4 and $K^1$ is the ratio of $m^1/n$;

formula [I-a] is:

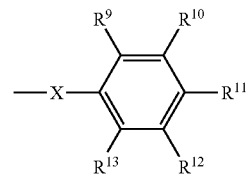

wherein X is O or NH, and $R^9$ to $R^{13}$, which may be the same or different, are independently selected from the group consisting of H, alkyl, aryl, alkenyl, alkoxy, amino, N-alkylamide, N-arylamide, hydroxy, halogen atom, acyl, acyloxy, acylamide, acyl-N-alkylamide, carboxyl, alkoxycarbonyl, or sulfonyl. In the above, at least one of $R^1$ to $R^8$ and $R^9$ to $R^{13}$ is sulfonyl group.

Formula [II] is:

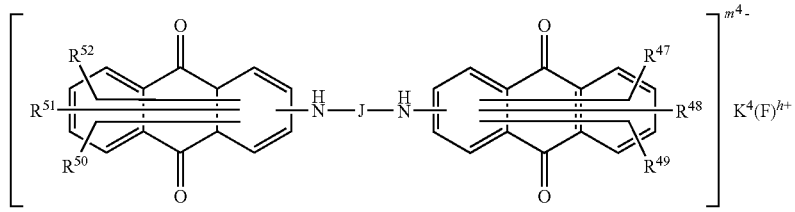

wherein $R^{47}$ to $R^{52}$, which may be the same or different, are independently selected from the group consisting of H, alkyl, aryl, alkenyl, alkoxy, amino, N-alkylamide, N-arylamide, hydroxy, halogen atom, acyl, acyloxy, acylamide, acyl-N-alkylamide, carboxyl, alkoxycarbonyl, or sulfonyl, and at least one of $R^{47}$ to $R^{52}$ is of sulfonyl. $(F)^{h+}$ represents ammonium ion or a cation derived from an organic amino compounds or a basic dye wherein h is 1 or 2, $m^4$ is an integer from 1 to 4 and $K^4$ is the ratio of $m^4/h$.

Formula J in formula [II] is selected from formula [II-a] or formula [II-b] and binds two anthraquinone.

fomula [II-a]:

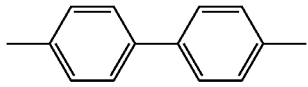

formula [II-b]:

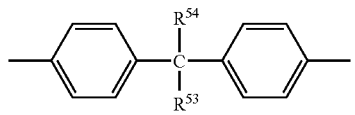

wherein $R^{53}$ to $R^{54}$, which may be the same or different, are independently selected from the group consisting of alkyl (having 1 to 8 carbon atoms) or hydrogen.

The amine salt of anthraquinone dyes used as colorants in the invention exhibit colors of red, blue, violet and green. It is possible to obtain black shades by mixing the dye salts mentioned above with red dyes such as perinone dyes and/or yellow dyes or monoazo metal complex dyes or anthrapyridone dyes at predetermined weight ratios.

BRIEF DESCRIPTION OF THE DRAWINGS

The invention will be better understood upon having reference to the drawings herein.

DETAILED DESCRIPTION OF THE INVENTION

Figure 1:
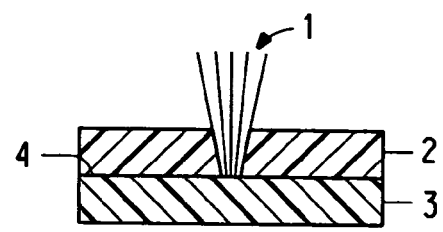
FIG. 1 is a view of the articles in contact and with a laser beam applied thereto.

The dye salts of the desired structure represented by formula [I] or formula [II] used in the invention and described above are prepared by commonly known methods, as is readily appreciated by those having skill in the art. One convenient technique is to react anthraquinone dyestuff with organic amine in a solvent. Formula [I] or formula [II] reacted by this way has good transmittance in a main laser beam wavelength (1200 nm to 800 nm).

Basic dyes listed in the color index and useful in the instant invention include, C.I.basic red dye: C.I.basic red 1, 2, 3, 4, 5, 6, 8, 9, 10, 11, 12, 13, 15, 16, 17, 19, 20, 26, 27, 35, 36, 37, 48, 49, 52, 53, 54, 66, 68, C.I.basic blue dye: C.I.basic blue 1, 2, 3, 4, 5, 6, 7, 8, 9, 10, 11, 12, 13, 14, 15, 18, 20, 21, 22, 23, 24, 25, 26, 35, 36, 37, 45, 46, 47, 49, 50, 55, 56, 60, 62, 67, 75, 77, 79, 80, 81, 83, 87, 88, 89, 90, 94, 95, 96, 97, C.I.basic violet dye: C.I.basic violet 1, 2, 3, 4, 5, 6, 7, 8, 10, 11, 12, 13, 14, 15, 16, 17, 20, 21, 23, 24, 25, 27, 40, C.I.basic green dye: C.I.basic green 1, 3, 4, 6, 9, 10, Suitable amines for use in producing the above-mentioned anthraquinone dyes in dyestuffs and/or capable of salt formation in dyestuffs include aliphatic amine, alicyclic amine, alkoxyalkyl amine, amine having alkanol, diamine, amine of guanidine derivatives, and aromatic amine.

Examples of anthraquinone acid dyes which are useful in preparation of the dye salts of formula [I] used as colorants in the compositions of the invention are given below in Tables 1-1 and 1-2. Designations in the left hand column (such as "I-2" and "I-13") will assist the reader in understanding discussions about specific dye salts later in the description.

TABLE 1-1

| Pro. Ex. No. | $R^1, R^2, R^3, R^4, R^5, R^6, R^7, R^8$ | $K^1(Z)^{n+}$ |
|---|---|---|
| I-1 | $R^2 = R^5 = R^6 = R^7 = R^8 = H, R^4 = OH,$ $R^1 = R^3$ I-a, Formula[I-a]: X = NH, $R^{11} = NO_2$, $R^9 = SO_3H$ or $SO_3^-$, $R^{10} = R^{12} = R^{13} = H$ | Rosin ammonium |

TABLE 1-1-continued

| Pro. Ex. No. | $R^1, R^2, R^3, R^4, R^5, R^6, R^7, R^8$ | $K^1(Z)^{n+}$ |
|---|---|---|
| I-2 | $R^2 = R^3 = R^5 = R^6 = R^7 = R^8 = H$, $R^4 = OH$, $R^1 = $ I-a, Formula[I-a]: $X = NH$, $R^{11} = CH_3$, $R^9 = SO_3^-$, $R^{10} = R^{12} = R^{13} = H$ | $H_3N^+(CH_2)_6NH_2$ |
| I-3 | $R^2 = R^3 = R^5 = R^6 = R^7 = R^8 = H$, $R^1 = $ I-a, $R^4 = $ Y-W, Formula[I-a]: $X = NH$, $R^{11} = CH_3$, $R^9 = SO_3^-$, $R^{10} = R^{12} = R^{13} = H$ Y-W: $Y = NH$, $W = CH_3$ | $C_{12}H_{25}N^+H_3$ |
| I-4 | $R^2 = R^3 = R^5 = R^6 = R^7 = R^8 = H$, $R^1 = R^4 = $ I-a, Formula[I-a]: $X = NH$, $R^{11} = CH_3$, $R^9 = SO_3H$ or $SO_3^-$, $R^{10} = R^{12} = R^{13} = H$ | $(C_4H_9)_4N^+$ |
| I-5 | $R^2 = R^3 = R^5 = R^6 = R^7 = R^8 = H$, $R^1 = R^4$ I-a, Formula[I-a]: $X = NH$, $R^9 = R^{11} = R^{13} = CH_3$, $R^{12} = SO_3H$ or $SO_3^-$, $R^{10} = H$ | $H_3N^+(CH_2)_6NH_2$ |
| I-6 | $R^2 = R^3 = R^5 = R^6 = R^7 = R^8 = H$, $R^1 = R^4 = $ I-a, Formula[I-a]: $X = NH$, $R^{11} = CH_3$, $R^9 = SO_3^-$, $R^{10} = R^{12} = R^{13} = H$ | $(N^+H_3)_2CNH$ |
| I-7 | $R^2 = R^3 = R^5 = R^6 = R^7 = R^8 = H$, $R^1 = R^4 = $ I-a, Formula[I-a]: $X = NH$, $R^{11} = C_4H_9$, $R^9 = SO_3H$ or $SO_3^-$, $R^{10} = R^{12} = R^{13} = H$ | $H_3N^+(CH_2)_6NH_2$ |
| I-8 | $R^2 = R^3 = R^5 = R^7 = R^8 = H$, $R^1 = R^4 = $ I-a, $R^6 = $ Y-W, Formula[I-a]: $X = NH$, $R^{11} = CH_3$, $R^9 = SO_3H$ or $SO_3^-$, $R^{10} = R^{12} = R^{13} = H$ Y-W: $Y = S$, $W = $ methylphenyl | $H_3N^+(CH_2)_4NH_2$ |
| I-9 | $R^2 = R^3 = R^5 = R^6 = R^7 = R^8 = H$, $R^1 = R^4 = $ I-a, Formula[I-a]: $X = NH$, $R^{11} = C_4H_9$, $R_9 = SO_3^-$, $R^{10} = R^{12} = R^{13} = H$ | $2(H_3N^+(CH_2)_6NH_2)$ |
| I-10 | $R^2 = R^5 = R^6 = R^7 = R^8 = H$, $R^3 = SO_3^-$, $R^4 = NH_2$, $R^1 = $ I-a, Formula[I-a]: $X = NH$, $R^{11} = N(C_3H_7)COCH_3$, $R^9 = R^{10} = R^{12} = R^{13} = H$ | N-trimethyl-N-benzyl Anmmonium |
| I-11 | $R^2 = R^5 = R^7 = R^8 = H$, $R^3 = R^6 = SO_3^-$, $R^4 = NH_2$, $R^1 = $ I-a, Formula[I-a]: $X = NH$, $R^{11} = NHCOCH_3$, $R^9 = R^{10} = R^{12} = R^{13} = H$ | $2(CH_3)_4N^+$ |
| I-12 | $R^2 = R^3 = R^5 = R^6 = R^7 = R^8 = H$, $R^1 = R^4 = $ I-a, Formula[I-a]: $X = NH$, $R^9 = R^{11} = R^{13} = CH_3$, $R^{12} = SO_3H$ or $SO_3^-$, $R^{10} = H$ | Diphenylguanidine anmmonium |
| I-13 | $R^2 = R^3 = R^5 = R^6 = R^7 = R^8 = H$, $R^1 = R^4 = $ I-a, Formula[I-a]: $X = NH$, $R^{11}$ $CH_3$, $R^9 = SO_3H$ or $SO_3^-$, $R^{10} = R^{12} = R^{13} = H$ | Bis(p-methylphenyl) guanidine anmmonium |
| I-14 | $R^2 = R^3 = R^4 = R^5 = R^6 = R^7 = H$, $R^1 = R^8 = $ I-a, Formula[I-a]: $X = NH$, $R^{11} = CH_3$, $R^9 = SO_3H$ or $SO_3^-$, $R^{10} = R^{12} = R^{13} = H$ | $C_{12}H_{25}N^+H_3$ |
| I-15 | $R^5 = R^6 = R^7 = R^8 = H$, $R^1 = R^4 = NH_2$, $R^2 = R^3 = $ I-a, Formula[I-a]: $X = O$, $R^{11} = CH_3$, $R^9 = SO_3H$ or $SO_3^-$, $R^{10} = R^{12} = R^{13} = H$ | $(CH_3)_4N^+$ |

Pro. Ex. No. = Product Example Number

TABLE 1-2

| Pro. Ex. No. | $R^1, R^2, R^3, R^4, R^5, R^6, R^7, R^8$ | $K^1(Z)^{n+}$ |
|---|---|---|
| I-16 | $R^5 = R^6 = R^7 = R^8 = H$, $R^1 = R^4 = NH_2$, $R^2 = R^3 = $ I-a, Formula[I-a]: $X = O$, $R^{11} = SO_3H$ or $SO_3^-$, $R^9 = R^{10} = R^{12} = R^{13} = H$ | $H_3N^+(CH_2)_6NH_2$ |
| I-17 | $R^3 = R^6 = R^7 = R^8 = H$, $R^2 = CH_3$, $R^4 = NH_2$, $R^4 = SO_3H$ or $SO_3^-$, $R^1 = $ I-a, Formula[I-a]: $X = NH$, $R^{11} = CH_3$, $R^9 = SO_3H$ or $SO_3^-$, $R^{10} = R^{12} = R^{13} = H$ | $C_4H_9N^+H_3$ |
| I-18 | $R^3 = R^6 = R^7 = R^8 = H$, $R^2 = Br$, $R^4 = NH_2$, $R^5 = SO_3H$ or $SO_3^-$, $R^1 = $ I-a, Formula[I-a]: $X = NH$, $R^{11} = CH_3$, $R^9 = SO_3H$ or $SO_3^-$, $R^{10} = R^{12} = R^{13} = H$ | $H_3N^+(CH_2)_4NH_2$ |
| I-19 | $R^2 = R^6 = R^7 = R^8 = H$, $R^3 = OC_{12}H_{25}$, $R^4 = NH_2$, $R^5 = SO_3H$ or $SO_3^-$, $R^1 = $ I-a, Formula[I-a]: $X = NH$, $R^{11} = SO_3H$ or $SO_3^-$, $R^9 = R^{10} = R^{12} = R^{13} = H$ | $C_2H_5OC_3H_6N^+H_3$ |
| I-20 | $R^2 = R^3 = R^6 = R^7 = H$, $R^4 = R^8 = OH$, $R^1 = R^5 = $ I-a, Formula[I-a]: $X = NH$, $R^{11} = CH_3$, $R^9 = SO_3H$ or $SO_3^-$, $R^{10} = R^{12} = R^{13} = H$ | $(C_8H_{17})_4N^+$ |
| I-21 | $R^2 = R^3 = R^5 = R^6 = R^7 = R^8 = H$, $R^1 = R^4 = $ I-a, Formula[I-a]: $X = NH$, $R^9 = R^{11} = R^{13} = CH_3$, $R^{12} = SO_3^-$, $R^{10} = H$ | $2(H_3N^+(CH_2)_6NH_2)$ |
| I-22 | $R^2 = R^5 = R^6 = R^7 = R^8 = H$, $R^3 = SO_3^-$, $R^4 = NH_2$, $R^1 = $ I-a, Formula[I-a]: $X = NH$, $R^{11} = NHCOCH_3$, $R^9 = R^{10} = R^{12} = R^{13} = H$ | $C_4H_9N^+H_3$ |
| I-23 | $R^2 = R^3 = R^5 = R^6 = R^7 = R^8 = H$, $R^1 = R^4 = $ I-a, Formula[I-a]: $X = NH$, $R^{11} = CH_3$, $R^9 = SO_3H$ or $SO_3^-$, $R^{10} = R^{12} = R^{13} = H$ | $H_3N^+(CH_2)_6NH_2$ |
| I-24 | $R^2 = R^3 = R^4 = R^5 = R^6 = R^7 = H$, $R^1 = R^8 = $ I-a, Formula[I-a]: $X = NH$, $R^{11} = CH_3$, $R^9 = SO_3H$ or $SO_3^-$, $R^{10} = R^{12} = R^{13} = H$ | $C_2H_5OC_3H_6N^+H_3$ |
| I-25 | $R^2 = R^5 = R^6 = R^7 = R^8 = H$, $R^3 = SO_3^-$, $R^4 = NH_2$, $R^1 = $ I-a, Formula[I-a]: $X = NH$, $R^{11} = NHCOCH_3$, $R^9 = R^{10} = R^{12} = R^{13} = H$ | $H_3N^+(CH_2)_6NH_2$ |
| I-26 | $R^2 = R^5 = R^6 = R^7 = R^8 = H$, $R^3 = SO_3^-$, $R^4 = NH_2$, $R^1 = $ I-a, Formula[I-a]: $X = NH$, $R^{11} = N(CH_3)COCH_3$, $R^9 = R^{10} = R^{12} = R^{13} = H$ | Cyclohexyl anmmonium |
| I-27 | $R^2 = R^3 = R^5 = R^6 = R^7 = R^8 = H$, $R^1 = R^4 = $ I-a, Formula[I-a]: $X = NH$, $R^9 = R^{11} = R^{13} = CH_3$, $R^{12} = SO_3H$ or $SO_3^-$, $R^{10} = H$ | $C_2H_5OC_3H_6N^+H_3$ |
| I-28 | $R^2 = R^3 = R^5 = R^6 = R^7 = R^8 = H$, $R^4 = OH$, $R^1 = $ I-a, Formula[I-a]: $X = NH$, $R^{11} = CH_3$, $R^9 = SO_3^-$, $R^{10} = R^{12} = R^{13} = H$ | $H_3N^+(CH_2)_6NH_2$ |
| I-29 | $R^2 = R^5 = R^6 = R^7 = R^8 = H$, $R^3 = SO_3^-$, $R^4 = NH_2$, $R^1 = $ I-a, Formula[I-a]: $X = NH$, $R^{11} = N(CH_3)COCH_3$, $R^9 = R^{10} = R^{12} = R^{13} = H$ | N-trimethyl-N-benzyl Anmmonium |
| I-30 | $R^3 = R^5 = R^6 = R^7 = H$, $R^1 = R^4 = OH$, $R^2 = $ I-a, Formula[I-a]: $X = NH$, $R^9 = CH_3$, $R^{11} = SO_3^-$, $R^{10} = R^{12} = R^{13} = H$ | N-tributyl-N-benzyl anmmonium |
| I-31 | $R^5 = R^6 = R^7 = R^8 = H$, $R^1 = R^4 = NH_2$, $R^3 = SO_3^-$, $R^2 = $ I-a, Formula[I-a]: $X = O$, $R^9 = R^{10} = R^{11} = R^{12} = R^{13} = H$ | $C_4H_9N^+H_3$ |
| I-32 | $R^3 = R^6 = R^7 = R^8 = H$, $R^4 = NH_2$, $R^2 = R^5 = SO_3H$ or $SO_3^-$, $R^1 = $ I-a, Formula[I-a]: $X = NH$, $R^{11} = C_{12}H_{25}$, $R^9 = R^{10} = R^{12} = R^{13} = H$ | Benzylurea anmmonium |
| I-33 | $R^2 = R^5 = R^6 = R^7 = R^8 = H$, $R^3 = SO_3^-$, $R^4 = NH_2$, $R^1 = $ I-a, Formula[I-a]: $X = NH$, $R^{10} = COOC_2H_5$, $R^9 = R^{11} = R^{12} = R^{13} = H$ | $H_3N^+(CH_2)_6NH_2$ |

Pro. Ex. No. = Product Example Number

Examples of anthraquinone acid dyes which are useful in preparation of the dye salts of formula [II] used as colorant comprised in the compositions of the invention are given in Table 2 below.

TABLE 2

| Pro. Ex. No. | J | $R^{47}$ | $R^{48}$ | $R^{49}$ | $R^{50}$ | $R^{51}$ | $R^{52}$ | $K^4(F)^{h+}$ |
|---|---|---|---|---|---|---|---|---|
| II-1 | Formula[II-a] | $SO_3^-$ | $NH_2$ | H | $SO_3^-$ | $NH_2$ | H | $2(H_3N^+(CH_2)_6NH_2)$ |
| II-2 | formula[II-a] | $SO_3^-$ | $NH_2$ | H | $SO_3H$ | $NH_2$ | H | $H_3N^+(CH_2)_6NH_2$ |
| II-3 | formula[II-a] | $SO_3^-$ | OH | H | $SO_3H$ | OH | H | $C_{12}H_{25}N^+H_3$ |
| II-4 | Formula[II-b], $R^{53}=R^{54}=H$ | $SO_3^-$ | $NH_2$ | H | $NH_2$ | Cl | H | $C_2H_5OC_3H_6N^+H_3$ |
| II-5 | formula[II-b], $R^{53}=R^{54}=CH_3$ | $SO_3^-$ | $NH_2$ | H | $SO_3H$ | $NH_2$ | H | Bis(p-methylphenyl) guanidine anmmonium |
| II-6 | formula[II-b], $R^{53}=R^{54}=CH_3$ | $SO_3^-$ | $NH_2$ | H | $SO_3^-$ | $NH_2$ | H | $H_3N^+(CH_2)_4N^+H_3$ |
| II-7 | formula[II-b], $R^{53}=R^{54}=H$ | $SO_3^-$ | $NH_2$ | H | $SO_3H$ | $NH_2$ | H | Rosin anmmonium |
| II-8 | formula[II-b], $R^{53}=R^{54}=H$ | $SO_3^-$ | $NH_2$ | H | $SO_3H$ | $NH_2$ | H | $H_3N^+(CH_2)_6NH_2$ |
| II-9 | formula[II-b], $R^{53}=H$, $R^{54}=$phenyl | $SO_3^-$ | OH | $OCH_3$ | $SO_3H$ | OH | $OCH_3$ | $(C_4H_9)_4N^+$ |
| II-10 | formula[II-b], $R^{53}=R^{54}=H$ | $SO_3^-$ | $C_3H_9$ | $C_3H_9$ | $SO_3H$ | H | H | N-tributhyl-N-benzyl Anmmonium |

Pro. Ex. No. = Product Example Number

A particularly preferred amine is hexamethylendiamine in polyamide, due to their structural similarities. Therefore, formula [I] or formula [II] reacted by hexamethylendiamine have good solubility and disperse in polyamide.

Examples of the black dyes containing a mixture of two dye salts of formula [I], or a mixture of the dye salt of formula [I] and the dye salt of formula [III] are below:

Example 1

Black Dye

The anthraquinone dye salts of formula [I-21]: the anthraquinone dye salts of formula [I-23]: in a weight ratio of 4:5.

Example 2

Black Dye

The anthraquinone dye salt of formula [I-7]: anthraquinone dye salt of formula [II-8]: in a weight ratio of 1:1.

Various perinone dyes can be mixed with the above-mentioned dye salt of formula [I] or formula [II] for use as a black colorant in the composition of the invention. These are known products of formula [III] below.

Formula [III]:

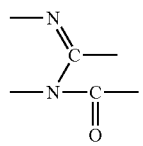

The perinone dyes which are mixed with the anthraquinone to produce a black dye may be used alone or in combination thereof.

Preferred perinone dyes used in the composition of the invention when solubility and/or dispersion in the resin are considered, are those of formula [IV], formula [IV]:

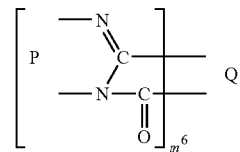

wherein P and Q, which may be the same or different, are independently constituent units represented by the following formulas [IV-a] to [IV-c]; and $R^{14}$ to $R^{29}$, which may be the same or different, are independently an atom or a group selected from the group consisting of H, halogen atom such as Cl, Br, alkyl group having 1 to 18 carbon atoms, alkoxy group having 1 to 18 carbon atoms, aralkyl group, aryl group; and $m^6$ is the number 1 or 2.

formula [IV-a]:

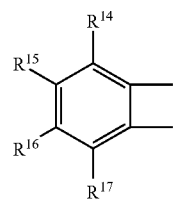

formula [IV-b]:

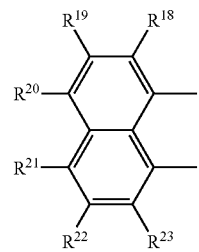

formula [IV-c]:

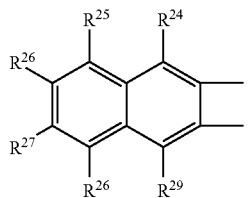

The above mentioned perinone dyes have practical heat resistance in molding and good transmittance in a main laser beam wavelength (800 nm to 1200 nm).

Dyes which belong to the class of perinone dyes listed in the color index are for example C.I.Solvent Orange 60, 78, C.I.Solvent Red 135, 162, 178, 179, C.I.Solvent Violet 29, C.I.Pigment Orange 43, C.I.Pigment Red 149. If solubility and dispersibility in the resin are enhanced, solvent type dyes are preferred.

Examples of the perinone dyes of the formula [IV] are listed below in Table 3.

TABLE 3

| Pro. Ex. No. | P | Q |
|---|---|---|
| IV-1 | Formula[IV-b], $R^{18} = R^{19} = R^{20} = R^{21} = R^{22} = R^{23} = H$ | Formula[IV-a], $R^{14} = R^{15} = R^{16} = R^{17} = H$ |
| IV-2 | Formula[IV-b], $R^{18} = R^{19} = R^{20} = R^{21} = R^{22} = R^{23} = H$ | Formula[IV-a], $R^{14} = R^{15} = R^{16} = R^{17} = Cl$ |
| IV-3 | Formula[IV-b], $R^{18} = R^{19} = R^{20} = R^{21} = R^{22} = R^{23} = H$ | Formula[IV-c], $R^{24} = R^{25} = R^{26} = R^{27} = R^{28} = R^{29} = H$ |
| IV-4 | Formula[IV-a], $R^{14} = R^{15} = R^{16} = R^{17} = H$ | Formula[IV-b], $R^{18} = R^{19} = R^{20} = R^{21} = R^{22} = R^{23} = H$ |
| IV-5 | Formula[IV-b], $R^{18} = R^{19} = R^{20} = R^{21} = R^{22} = R^{23} = H$ | Formula[IV-c], $R^{24} = R^{26} = R^{27} = R^{28} = R^{29} = H, R^{25} = OC_2H_5$ |
| IV-6 | Formula[IV-b], $R^{18} = R^{19} = R^{20} = R^{21} = R^{22} = R^{23} = H$ | Formula[IV-a], $R^{14} = R^{15} = R^{17} = H, R^{16} = $ benzoyl |
| IV-7 | 2Formula[IV-b], $R^{18} = R^{19} = R^{20} = R^{22} = R^{23} = H, R^{21} = C_4H_9$ | Formula[IV-a], $R^{14} = R^{17} = H$ |
| IV-8 | Formula[IV-b], $R^{18} = R^{19} = R^{20} = R^{21} = R^{22} = R^{23} = H$ | Formula[IV-c], $R^{24} = R^{26} = R^{27} = R^{28} = R^{29} = H, R^{25} = $ phenyl |
| IV-9 | Formula[IV-b], $R^{18} = R^{19} = R^{20} = R^{21} = R^{22} = R^{23} = H$ | Formula[IV-a], $R^{15} = R^{16} = R^{17} = H, R^{14} = Br$ |
| IV-10 | Formula[IV-b], $R^{18} = R^{19} = R^{20} = R^{21} = R^{22} = R^{23} = H$ | Formula[IV-a], $R^{15} = R^{16} = R^{17} = H, R^{14} = COOH$ |

Pro. Ex. No. = Product Example Number

Examples of the black dyes containing a mixture of the dye salts of formula [I] or formula [II] and perinone dyes are described below:

Example 3

Black Dye

The anthraquinone dye salt of formula [I-11]: the anthraquinone dye salt of formula [I-3]: perinone red dye of the following formula [IV-3]: anthraquinone yellow dye of the following formula [a] in a weight ratio of 5:4:1:1.

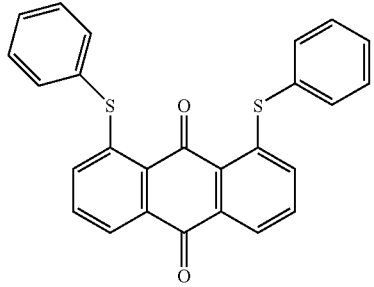

Formula [a]

Example 4

Black Dye

The anthraquinone dye salt of formula [I-11]: the anthraquinone dye salt of formula [I-7]: perinone orange dye of the following formula [IV-1]: anthraquinone yellow dye of the following formula [a] in a weight ratio of 5:3:1:1.

Example 5

Black Dye

The anthraquinone dye salt of formula [I-21]: perinone red dye of the following formula [IV-3]: anthraquinone yellow dye of the following formula [a] in a weight ratio of 6:2:1.

Example 6

Black Dye

The anthraquinone dye salt of formula [I-5]: perinone red dye of the following formula [IV-3]: perinone orange dye of the following formula [IV-1] in a weight ratio of 3:2:1.

Example 7

Black Dye

The anthraquinone dye salt of formula [I-6]: perinone red dye of the following formula [IV-3]: anthraquinone yellow dye of the following formula [a] in a weight ratio of 6:2:1.

Example 8

Black Dye

The anthraquinone dye salt of formula [I-6]: perinone red dye of the following formula [IV-3]: perinone orange dye of the following formula [IV-1] in a weight ratio of 3:2:1.

Example 9

Black Dye

The anthraquinone dye salt of formula [I-21]: perinone red dye of the following formula [IV-3]: anthraquinone yellow dye of the following formula [b] in a weight ratio of 3:2:1.

Formula [b]:

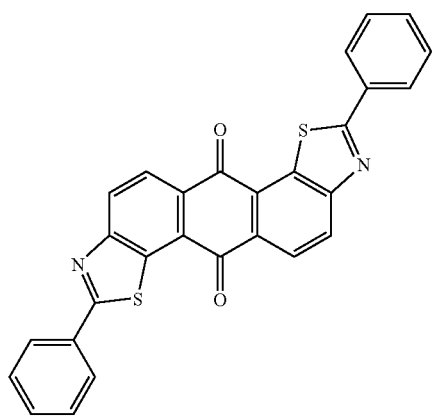

Example 10

Black Dye

The anthraquinone dye salt of formula [I-23]: perinone red dye of the following formula [IV-3] in a weight ratio of 2:1.

Example 11

Black Dye

The anthraquinone dye salt of formula [I-21]: the anthraquinone dye salt of formula [I-23]: perinone red dye of the following formula [IV-3] in a weight ratio of 3:1:1.

Example 12

Black Dye

The anthraquinone dye salt of formula [I-9]: perinone red dye of the following formula [IV-2]: anthraquinone yellow dye of the following formula [b] in a weight ratio of 6:2:1.

Example 13

Black Dye

The anthraquinone dye salt of formula [II-8]: perinone red dye of the following formula [IV-3]: anthraquinone yellow dye of the following formula [a] in a weight ratio of 6:2:1.

Example 14

Black Dye

The anthraquinone dye salt of formula [II-4]: perinone red dye of the following formula [IV-2]: anthraquinone yellow dye of the following formula [a] in a weight ratio of 6:2:1.

Example 15

Black Dye

The anthraquinone dye salt of formula [II-10]: perinone red dye of the following formula [IV-3]: anthraquinone yellow dye of the following formula [a] in a weight ratio of 6:2:1.

Example 16

Black Dye

The anthraquinone dye salt of formula [II-2]: perinone red dye of the following formula [IV-3]: anthraquinone yellow dye of the following formula [b] in a weight ratio of 6:2:1.

Example 17

Black Dye

The anthraquinone dye salt of formula [I-5]: The anthraquinone dye salt of formula [II-8]: perinone red dye of the following formula [IV-3] in a weight ratio of 3:3:1.

Dyes which belong to monoazo complex dyes can be mixed with the dye salts of formula [I] or formula [II] to produce a black dye for use as a colorant in the composition of the invention, and as represented by formula [V] below, formula [V]:

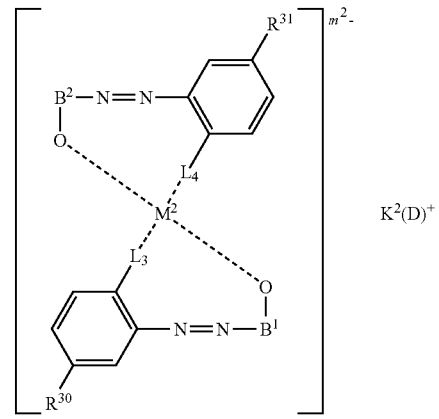

wherein $R^{30}$ and $R^{31}$, which may be the same of different, are Cl, $SO_2R^{32}$, $SO_2(-R^{33})(-R^{34})$, or H; wherein $R^{33}$ and $R^{34}$, which may be the same or different, are independently hydrogen atom, linear or branched C1-C4 alkyl; $R^{32}$ is linear or branched C1-C4 alkyl; $L_3$ and $L_4$ are independently O or COO; $(D)^+$ is hydrogen ion, cation of alkali metals, ammonium ion, cations of organic amine including aliphatic primary, secondary and tertiary amines, quaternary ammonium ion; $K^2$ is an integer, $m^2$ is 0, 1 or 2; $M^2$ is selected from metals of ionic valency from 2 to 4 (such as Zn, Sr, Cr, Al, Ti, Fe, Zr, Ni, Mn, B[boron] and Co), preferably a trivalent metal such as Cu or trivalent metals such as Cr, Co, Ni, and Al.

$B^1$ and $B^2$ are represented by formula [V-a] or formula [V-b].

formula [V-a]:

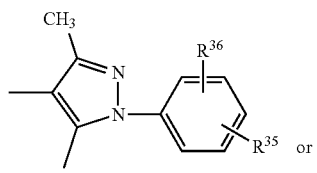

or formula [V-b]:

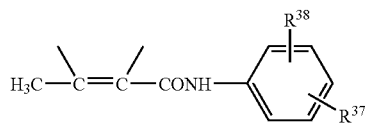

wherein $R^{35}$ and $R^{37}$, which may be the same of different, are Cl, $SO_2R^{32}$, $SO_2(-R^{33})(-R^{34})$, or H; $R^{33}$ and $R^{34}$, which may be the same or different, are independently hydrogen atom, linear or branched C1-C4 alkyl; and $R^{36}$ and $R^{38}$, which may be the same or different, are independently hydrogen atom, linear or branched C1-C18 alkyl, carboxyl, hydroxyl, C1-C18 alkoxy, amino or halogen atoms.

Suitable cations for use in the above-mentioned monoazo complex dyes are $H^+$; cations of alkali metal, ammonium ion, cations of organic amine (including aliphatic primary, secondary and tertiary amines), and quaternary ammonium ion.

Suitable amines for use in producing the above-mentioned monoazo dyes and common in dyestuffs include aliphatic amine, alicyclic amine, alkoxyalkyl amine, amine having alkanol, diamine, amine of guanidine derivatives, and aromatic amine.

Examples of the monoazo complex dyes of formula [V], wherein $B^1$ and $B^2$ are of the formula [V-a] are show below at Formula [V-c] and together with the accompanying information in Table 4.

Formula [V-c]:

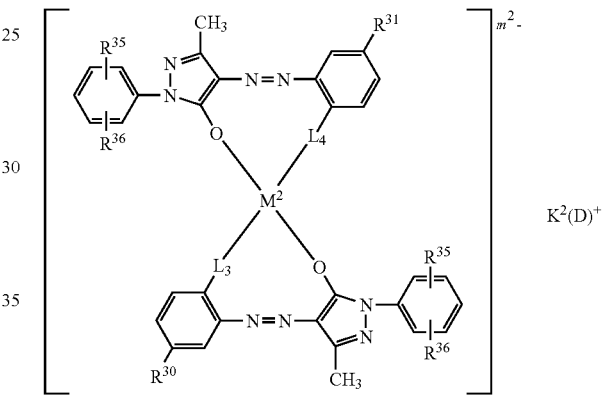

TABLE 4

| Pro. Ex. No | $R^{30}$ | $R^{31}$ | $R^{35}$ | $R^{36}$ | $M^2$ | $L_3$ | $L_4$ | $m^2$ | $K^2(D)^+$ |
|---|---|---|---|---|---|---|---|---|---|
| V-1 | H | H | H | H | Cr | COO | COO | 1 | $H^+$ |
| V-2 | Cl | Cl | $SO_2NH_2$ | H | Cr | O | O | 1 | $H^+$ |
| V-3 | $SO_2NH_2$ | $SO_2NH_2$ | $SO_2NH_2$ | H | Cr | O | O | 1 | $H^+$ |
| V-4 | Cl | Cl | $SO_2NH_2$ | H | Co | O | O | 1 | $H^+$ |
| V-5 | $SO_2NH_2$ | $SO_2NH_2$ | H | H | Ni | O | O | 1 | $H^+$ |
| V-6 | H | H | $SO_2NH_2$ | H | Cu | COO | COO | 1 | $H^+$ |
| V-7 | H | H | H | H | Cr | COO | COO | 1 | $C_4H_9CH(C_2H_5)OC_3H_6N^+H_3$ |
| V-8 | Cl | Cl | $SO_2NH_2$ | H | Cu | O | O | 1 | $C_{12}H_{25}N^+H_2(CH_2CH_2O)_2H$ |
| V-9 | Cl | Cl | $SO_2NH_2$ | H | Cr | O | O | 1 | $Na^+$ |
| V-10 | Cl | Cl | $SO_2NH_2$ | H | Cl | Co | O | O | 1 | $H^+$ |

Pro. Ex. No. = Product Example Number

Examples of the monoazo complex dyes of formula [V], wherein $B^1$ and $B^2$ are of the formula [V-b] are shown below at Formula [V-d] and together with the accompanying information in Table 5.

Formula [V-d]:

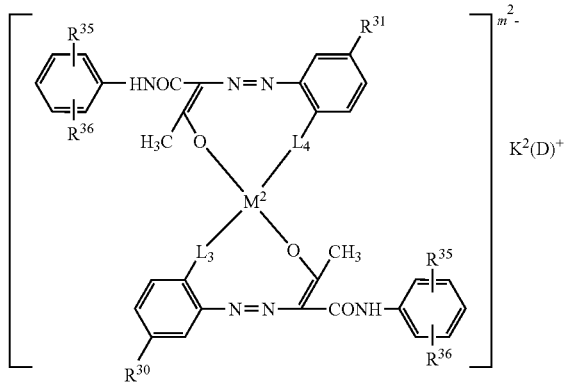

TABLE 5

| Pro. Ex. No. | $R^{30}$ | $R^{31}$ | $R^{35}$ | $R^{36}$ | $M^2$ | $L^3$ | $L^4$ | $m^2$ | $K^2(D)^+$ |
|---|---|---|---|---|---|---|---|---|---|
| V-11 | $SO_2NH_2$ | $SO_2NH_2$ | H | H | Co | O | O | 1 | $H^+$ |
| V-12 | H | H | $SO_2NH_2$ | H | Cr | COO | COO | 1 | $H^+$ |
| V-13 | Cl | Cl | H | H | Co | O | O | 1 | $C_4H_9CH(C_2H_5)OC_3H_6N^+H_3$ |
| V-14 | $SO_2NH_2$ | $SO_2NH_2$ | $SO_2NH_2$ | H | Cr | O | O | 1 | $NH_4^+$ |
| V-15 | Cl | Cl | $SO_2NH_2$ | H | Co | COO | COO | 1 | $H^+$ |

Pro. Ex. No. = Product Example Number

Examples of the black dyes containing a mixture of the dye salts of formula [I] or formula [II] and at least one of the monoazo complex dyes of the following formula [V] are provided in detail below:

Example 18

Black Dye

The anthraquinone dye salt of formula [II-2]: monoazo complex red dye of the following formula [V-2]: monoazo complex yellow dye of the following formula [V-14] in a weight ratio of 6:2:1.

Example 19

Black Dye

The anthraquinone dye salt of formula [I-21]: monoazo complex red dye of the following formula [V-2]: monoazo complex orange dye of the following formula [V-3] in a weight ratio of 6:2:1.

Example 20

Black Dye

The anthraquinone dye salt of formula [I-26]: monoazo complex red dye of the following formula [V-2]: monoazo complex orange dye of the following formula [V-3] in a weight ratio of 6:2:1.

Example 21

Black Dye

The anthraquinone dye salt of formula [I-7]: monoazo complex red dye of the following formula [V-2]: anthraquinone yellow dye of the following formula [a] in a weight ratio of 6:2:1.

Example 22

Black Dye

The anthraquinone dye salt of formula [I-5]: monoazo complex red dye of the following formula [V-2]: anthraquinone yellow dye of the following formula [b] in a weight ratio of 6:3:1.

Dyes which belong to anthrapyridone dyes can be mixed with the dye salts of formula [I] or formula [II] to produce a black dye for use as colorant in the composition of the invention, and are represented by formula [VI], Formula [VI]:

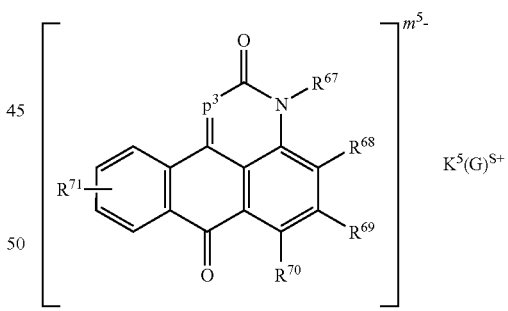

wherein $R^{67}$ to $R^{71}$, which may be the same or different, are independently selected from the group consisting of H, alkyl, aryl, alkenyl, alkoxy, amino, hydroxy, halogen atom, acyl, acyloxy, acylamide, acyl-N-alkylamide, carboxyl, alkoxycarbonyl, cyclohexylamide, sulfonyl, or formula [VI-a], and at least one of $R^{67}$ to $R^{74}$ is of sulfonyl, wherein $P^3$ may be the same or different, are independently selected from the group consisting of C—$R^{72}$, N; $R^{72}$ is H, alkyl, aryl, hydroxy, carboxyl, alkoxy, amino, benzoyl, benzyl wherein $(G)^{s+}$ represents ammonium ion or a cation derived from an organic amine compounds or a basic dye wherein s is 1 or 2, $m^5$ is an integer from 1 to 4 and $K^5$ is the ratio of $m^5/s$;

formula [VI-a]:

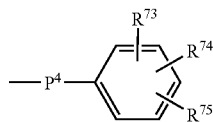

wherein $P^4$ is O or NH, and $R^{73}$ to $R^{75}$, which may be the same or different, are independently selected from the group consisting of H, alkyl, aryl, alkenyl, alkoxy, amino, N-alkylamide, N-arylamide, hydroxy, halogen atom, acyl, acyloxy, acylamide, acyl-N-alkylamide, carboxyl, alkoxycarbonyl, or sulfonyl.

Suitable amines for use in producing the above-mentioned anthrapyridone dyes in dyestuffs include aliphatic amine, alicyclic amine, alkoxyalkyl amine, amine having alkanol, diamine, amine of guanidine derivatives, and aromatic amine.

These anthrapyridone dyes are considered having good solubility and/or dispersion in the resin.

Examples of the anthrapyridone dyes of formula [VI] appear in Table 6 below.

TABLE 6

| Pro. Ex. No. | $R^{67}, R^{68}, R^{69}, R^{70}, R^{71}$ | $P^3$ | $K^5(G)^{\square+}$ |
|---|---|---|---|
| VI-1 | $R^{68} = R^{69} = R^{71} = H$, $R^{67} = CH_3$, $R^{70} = VI\text{-}a$, Formula VI-a: $P^4 = NH$, $R^{73} = SO_3^-$, $R^{74} = R^{75} = H$ | CH | $H_3N^+(CH_2)_6NH_2$ |
| VI-2 | $R^{68} = R^{69} = R^{71} = H$, $R^{67} = CH_3$, $R^{70} = VI\text{-}a$, Formula VI-a: $P^4 = NH$, $R^{73} = SO_3^-$, $R^{74} = R^{75} = H$ | CH | $(CH_3)_3N^+C_{12}H_{25}$ |
| VI-3 | $R^{68} = R^{69} = R^{71} = H$, $R^{67} = CH_3$, $R^{70} = VI\text{-}a$, Formula VI-a: $P^4 = NH$, $R^{73} = SO_3^-$, $R^{74} = R^{75} = H$ | CH | $C_2H_5OC_3H_6N^+H_3$ |
| VI-4 | $R^{68} = R^{69} = R^{71} = H$, $R^{67} = CH_3$, $R^{70} = VI\text{-}a$, Formula VI-a: $P^4 = NH$, $R^{73} = SO_3^-$, $R^{74} = CH_3$, $R^{75} = H$ | CH | $C_4H_9N^+H_3$ |
| VI-5 | $R^{68} = R^{69} = R^{71} = H$, $R^{67} = CH_3$, $R^{70} = VI\text{-}a$, Formula VI-a: $P^4 = NH$, $R^{73} = SO_3^-$, $R^{74} = CH_3$, $R^{75} = H$ | CH | N-trimethyl-N-benzyl Anmmonium |
| VI-6 | $R^{68} = R^{69} = R^{71} = H$, $R^{67} = CH_3$, $R^{70} = VI\text{-}a$, Formula VI-a: $P^4 = NH$, $R^{73} = R^{74} = SO_3^-$, $R^{75} = H$ | CH | $2(CH_3)_4N^+$ |
| VI-7 | $R^{68} = R^{69} = R^{71} = H$, $R^{67} = CH_3$, $R^{70} = VI\text{-}a$, Formula VI-a: $P^4 = NH$, $R^{73} = SO_3^-$, $R^{74} = C_4H_9$, $R^{75} = H$ | CH | $C_{12}H_{25}N^+H_2(CH_2CH_2O)_2H$ |
| VI-8 | $R^{68} = R^{69} = R^{71} = H$, $R^{67} = CH_3$, $R^{70} = VI\text{-}a$, Formula VI-a: $P^4 = NH$, $R^{73} = SO_3^-$, $R^{74} = Cl$, $R^{75} = H$ | CH | N-trimethyl-N-benzyl Anmmonium |
| VI-9 | $R^{68} = R^{69} = R^{71} = H$, $R^{67} = CH_3$, $R^{70} = VI\text{-}a$, Formula VI-a: $P^4 = NH$, $R^{73} = SO_3^-$, $R^{74} = CH_3$, $R^{75} = H$ | N | $C_2H_5OC_3H_6N^+H_3$ |
| VI-10 | $R^{68} = R^{69} = R^{71} = H$, $R^{67} = CH_3$, $R^{70} = VI\text{-}a$, Formula vi-a: $P^4 = NH$, $R^{73} = SO_3^-$, $R^{74} = C_8H_{17}$, $R^{75} = H$ | N | $C_{12}H_{25}N^+H_3$ |
| VI-11 | $R^{68} = R^{69} = R^{71} = H$, $R^{67} = H$, $R^{70} = VI\text{-}a$, Formula VI-a: $P^4 = NH$, $R^{73} = SO_3^-$, $R^{74} = R^{75} = CH_3$ | $C-C_4H_9$ | Bis(p-methylphenyl) guanidine anmmonium |
| VI-12 | $R^{67} = R^{69} = R^{71} = H$, $R^{68} = VI\text{-}a\text{-}1$, $R^{70} = VI\text{-}a\text{-}2$, formula VI-a-1: $P^4 = O$, $R^{73} = SO_3^-$, $R^{74} = C_{13}H_{27}$, $R^{75} = H$ formula VI-a-2: $P^4 = NH$, $R^{73} = SO_3^-$, $R^{74} = R^{75} = CH_3$ | C-benzoyl | $(CH_3)_3N^+C_{12}H_{25}$ |
| VI-13 | $R^{67} = R^{69} = R^{71} = H$, $R^{68} = VI\text{-}a\text{-}1$, $R^{70} = VI\text{-}a\text{-}2$, Formula VI-a-1: $P^4 = O$, $R^{73} = SO_3^-$, $R^{74} = CH_3$, $R^{75} = H$ formula VI-a-2: $P^4 = NH$, $R^{73} = SO_3^-$, $R^{74} = R^{75} = CH_3$ | C-benzoyl | N-trimethyl-N-benzyl anmmonium |
| VI-14 | $R^{68} = R^{69} = R^{71} = H$, $R^{67} = CH_3$, $R^{70} = VI\text{-}a$, Formula VI-a: $P^4 = O$, $R^{73} = SO_3^-$, $R^{74} = R^{75} = H$ | C-benzoyl | $(C_4H_9)_4N^+$ |
| VI-15 | $R^{68} = R^{69} = R^{71} = H$, $R^{67} = CH_3$, $R^{70} = VI\text{-}a$, Formula VI-a: $P^4 = NH$, $R^{73} = SO_3^-$, $R^{74} = R^{75} = H$ | CH | N-trimethyl-N-benzyl anmmonium |
| VI-16 | $R^{68} = R^{69} = R^{71} = H$, $R^{67} = CH_3$, $R^{70} = VI\text{-}a$, Formula VI-a: $P^4 = NH$, $R^{73} = SO_3^-$, $R^{74} = CH_3$, $R^{75} = H$ | CH | $H_3N^+(CH_2)_6NH_2$ |
| VI-17 | $R^{68} = R^{69} = R^{71} = H$, $R^{67} = CH_3$, $R^{70} = VI\text{-}a$, Formula vi-a: $P^4 = NH$, $R^{73} = SO_3^-$, $R^{74} = C_8H_{17}$, $R^{75} = H$ | N | Diphenylguanidine anmmonium |

Pro. Ex. No. = Product Example Number

Examples of the black dyes containing a mixture of the dye salts of formula [I] or formula [III] and at least one of the anthrapyridone dye of the following formula [VI] are described below:

Example 23

Black Dye

The anthraquinone dye salt of formula [I-5]: anthrapyridone red dye of the following formula [VI-2]: monoazo complex yellow dye of the following formula [V-14] in a weight ratio of 6:2:1.

Example 24

Black Dye

The anthraquinone dye salt of formula [I-6]: anthrapyridone red dye of the following formula [VI-1] in a weight ratio of 2:1.

Example 25

Black Dye

The anthraquinone dye salt of formula [I-7]: anthrapyridone red dye of the following formula [VI-18] in a weight ratio of 2:1.

Example 26

Black Dye

The anthraquinone dye salt of formula [I-5]: anthrapyridone red dye of the following formula [VI-9]: anthraquinone yellow dye of the following formula [b] in a weight ratio of 6:2:1.

Example 27

Black Dye

The anthraquinone dye salt of formula [I-5]: anthrapyridone red dye of the following formula [VI-9] in a weight ratio of 3:1.

Example 28

Black Dye

The anthraquinone dye salt of formula [I-4]: the anthraquinone dye salt of formula [I-11]: anthrapyridone red dye of the following formula [VI-2] in a weight ratio of 5:5:1.

Example 29

Black Dye

The anthraquinone dye salt of formula [I-29]: anthrapyridone red dye of the following formula [VI-15] in a weight ratio of 4:1.

Example 30

Black Dye

The anthraquinone dye salt of formula [I-3]: anthrapyridone red dye of the following formula [VI-4]: anthraquinone yellow dye of the following formula [a] in a weight ratio of 5:2:1.

Beside ever mentioned examples of the black dyes, by following mixture there can produce a black dye.

Example 31

Black Dye

The anthraquinone dye salt of formula [I-2]: anthraquinone yellow dye of the following formula [a] in a weight ratio of 6:1.

The thermoplastic resins for use in the inventive compositions include polyamides, polyesters, and the like as are commonly used in making a molded product. As the examples of the polyamide resins utilized in the present invention, condensation products of dicarboxylic acids and diamines, condensation products of aminocarboxylic acids and ring-opening polymerization products of cyclic lactams can be cited. As examples of dicarboxylic acids, adipic acid, azelaic acid, sebacic acid, dodecanedioic acid, isophthalic acid and terephthalic acid can be cited. As examples of diamines, tetramethylene diamine, hexamethylene diamine, octamethylene diamine, nonamethylene diamine, dodecamethylene diamine, 2-methylpentamethylene diamine, 2-methyloctamethylene diamine, trimethylhexamethylene diamine, bis(p-aminocyclohexyl)methane, m-xylene diamine and p-xylene diamine may be cited. As the example of aminocarboxylic acid, 11-aminododecanoic acid can be cited. As the examples of cyclic lactam, caprolactam and laurolactam can be cited. As the specific examples of condensation products and ring-opening polymerization products, aliphatic polyamides such as nylon 6, nylon 66, nylon 46, nylon 610, nylon 612, nylon 11, nylon 12, semi-aromatic polyamides such as polymetaxylene adipamide (nylon MXD6), polyhexamethylene terephthalamide (nylon 6T), polyhexamethylene isophthalamide (nylon 6I) and polynonamethylene terephthalamide nylon 9T), and copolymers and mixtures of these polymers can be cited. As the examples of the copolymers, nylon 6/66, nylon 66/6I, nylon 6I/6T and nylon 66/6T can be cited.

A wide range of common polyester molding compositions useful for blending with colorants in the practice of the present invention are known in the art. These include polymers which are, in general, condensation products of dicarboxylic acids and diols. Dicarboxylic acids can be selected from the group consisting of adipic acid, azelaic acid, sebacic acid, dodecanedioic acid, terephthalic acid, isophthalic acid, naphthalenedicarboxylic acid and diphenyl dicarboxylic acid, and diols can be selected from the group consisting of ethylene glycol, propylene glycol, butanediol, hexanediol, neopentyl glycol, cyclohexanediol, and bisphenol A. Preferred polyesters include polyethylene terephtalate (PET), polypropylene terephthalate (3GT), polybutylene terephthalate (PBT), polyethylene 2,6-naphthalate (PEN), polycyclohexane dimethylene terephthalate (PCT) and copolymers and mixtures thereof. As the examples of the copolymers, some of dicarboxylic acids or some of diols can be added to the condensation products. Polyester polymers may be copolymerized a little amount of components like trimesic acid, trimellitic acid, pyromellitic acid, glycerol, and pentaerythritol which have more than 3 functional groups.

Additional other polymers such as polycarbonate can also be presented, provided that the essential characteristics of the composition of the present invention are not substantially altered.

The amine salt of anthraquinone dyes of formula [I] or formula [III] are present in an amount of from 0.01 to 1% by weight, when the composition comprises polyamide 6 as at least the major component of the polyamide resin composition. The amount of the amine salt of anthraquinone dyes of formula [I] or formula [II] may be specialized for applications requiring different properties associated with the laser welding.

The composition of the present invention may contain an inorganic filler or reinforcing agent that includes, for example, fibrous reinforcement such as glass fiber and carbon fiber, glass flakes, glass beads, talc, kaolin, wollastonite, silica, calcium carbonate, potassium titanate and mica. Glass fiber and flakes are preferred selections. Glass fibers suitable for use in the present invention are those generally used as a reinforcing agents for thermoplastic resins and thermosetting resins. The preferred amount of glass fiber in the resin composition of the present invention is from about 5 to about 120 parts by weight, with respect to 100 parts by weight of the thermoplastic resin. If it is under 5 weight percent, it would be difficult to give sufficient reinforcement from the glass fiber, and if it is over 120 weight percent, it would have poor processibility and poor transparency to laser. It is preferable at about 5 to about 100 weight percent, and particularly preferable at about 15 to about 85 weight percent.

One or more optional compounds selected from a wide variety of compounds tailored for different applications of the resin compositions can be included in the compositions according to the present invention, as is understood among those having skill in the art.

Typically, additive compounds can include flame retardants, impact modifiers, viscosity modifiers, heat resistance improvers, lubricants, antioxidants and UV-and other stabilizers. The polyamide resin compositions of the present invention may have such additive compounds in suitable amounts so as not to harm characteristic properties of the compositions.

In the present invention, thermoplastic resin compositions are provided that are suitable for laser welding, including transparent articles for laser beam transmission to achieve welding together with the opaque article for laser beam absorption. Suitable opaque articles and their compositions are described for example in DE-A-4432081.

Figure 2:
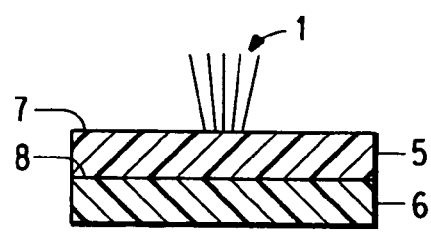
FIG. 2 is identical to FIG. 1, but with articles of the same color.

FIG. 1 is an illustration of a conventional laser welding arrangement. A laser beam 1 is transmitted through the first article 2 to the second article 3 containing laser beam absorbing combination, and the surface 4 of the second article 3 that have absorbed the laser energy 1 is melted and pressed with the surface of the first article 2 to weld them together. As shown in FIG. 2, first article 5 and second article 6 join at surface 8. The laser beam 1 is applied to the surface 7 of first article 5. Two thermoplastic components must have different transmission and absorption coefficients and it is difficult to weld two articles having the same color.

EXAMPLES

The present invention is illustrated by the following examples and comparative examples, but it should be construed that the invention is in no way limited to those examples. These examples are in part directed to the practical laser weldability of a combination of laser transmitting articles formed from the compositions of the Examples with laser absorbing articles formed by other compositions. Illustrations include nylon 6 (see Table 10 and 13), 66 (see Table 14) and polyester (see Table 15). Other properties necessary for use in molding articles being subject to laser welding, including laser transmission capability, are shown in other tables.

For instance, Examples A, B, C, J, K, M and Comparative Examples D, E, F, L, N are directed to the transmittance of the article.

Example A 400 grams of Nylon 6 ZYTEL pellets (available from E.I. DuPont de Nemours and Co., under the products name ZYTEL® 7301) were dried under vacuum at 120° C., for more than 8 hours, then mixed with a mixture of amine salt of anthraquinone dye of formula [I-21] (0.53 g) with perinone red dye represented by the formula [IV-3] (0.18 g) and anthraquinone yellow dye represented by the formula [a] (0.09 g) in a stainless tumble mixer with stirring for one hour. The mixture was then injection molded to form the injection molded test specimens (whose sizes are 48 mm×86 mm×3 mm) using K50-C produced by Kawaguchi Steel K.K. and the cylinder temperature was set to 250° C. Mold temperature was 60° C. Good and uniformly black appearance and surface gloss without color shading of the specimens were observed.

Example B 400 grams of Nylon 6 ZYTEL pellets (available from E.I. DuPont de Nemours and Co., under the product name ZYTEL® 7301) were dried under vacuum at 120° C., for more than 8 hours, then mixed with a mixture of amine salt of anthraquinone dye of formula [I-21] (0.53 g) with monoazo complex red dye of the following formula [V-2] (0.18 g) and another monoazo complex orange dye of the following formula [V-3] (0.09 g) in a stainless tumble mixer with stirring for one hour. The mixture was then injection molded to form the injection molded test specimens (whose sizes are 48 mm×86 mm×3 mm) using K50-C produced by Kawaguchi Steel K.K. and the cylinder temperature was set to 250° C. Mold temperature was 60° C. Good and uniformly black appearance and surface gloss without color shading of the specimens were observed.

Example C 400 grams of Nylon 6 ZYTEL pellets (available from E.I. DuPont de Nemours and Co., under the product name ZYTEL® 7301) were dried under vacuum at 120° C., for more than 8 hours, then mixed with a mixture of amine salt of anthraquinone dye of formula [I-6] (0.53 g) with perinone red dye represented by the formula [IV-3] (0.18 g) and anthraquinone yellow dye represented by the formula [a] (0.09 g) in a stainless tumble mixer with stirring for one hour. The mixture was then injection molded to form the injection molded test specimens (whose sizes are 48 mm×86 mm×3 mm) using K50-C produced by Kawaguchi Steel K.K. and the cylinder temperature was set to 250° C. Mold temperature was 60° C. Good and uniformly black appearance and surface gloss without color shading of the specimens were observed.

Comparative Example D 400 grams of Nylon 6 ZYTEL pellets (available from E.I. DuPont de Nemours and Co., under the product name ZYTEL® 7301) were dried under vacuum at 120° C., for more than 8 hours, then mixed with a mixture of anthraquinone green dye of the following formula [c] (0.53 g) with perinone red dye represented by the formula [IV-3] (0.18 g) and anthraquinone yellow dye represented by the formula [a] (0.09 g) in a stainless tumble mixer with stirring for one hour. The mixture was then injection molded to form the injection molded test specimens (whose sizes are 48 mm×86 mm×3 mm) using K50-C produced by Kawaguchi Steel K.K. and the cylinder temperature was set to 250° C. Mold temperature was 60° C. Good and uniformly black appearance and surface gloss without color shading of the specimens were observed.

Formula [c]:

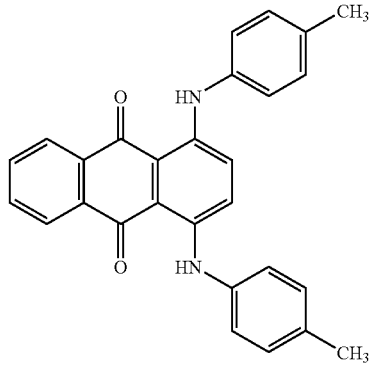

Comparative Example E 400 grams of Nylon 6 ZYTEL pellets (available from E.I. DuPont de Nemours and Co., under the product name ZYTEL® 7301) were dried under vacuum at 120° C., for more than 8 hours, then mixed with a mixture of anthraquinone violet dye of the following formula [d] (0.53 g) with perinone red dye represented by the formula [IV-3] (0.18 g) and anthraquinone yellow dye represented by the formula [a] (0.09 g) in a stainless tumble mixer with stirring for one hour. The mixture was then injection molded to form the injection molded test specimens (whose sizes are 48 mm×86 mm×3 mm) using K50-C produced by Kawaguchi Steel K.K. and the cylinder temperature was set to 250° C. Mold temperature was 60° C. Good and uniformly black appearance and surface gloss without color shading of the specimens were observed.

Formula [d]:

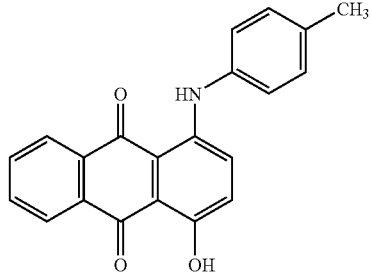

Comparative Example F 400 grams of Nylon 6 ZYTEL pellets (available from E.I. DuPont de Nemours and Co., under the product name ZYTEL® 7301) were dried under vacuum at 120° C., for more than 8 hours, then mixed with the monoazo complex black dye of the following formula [e] (0.80 g) in a stainless tumble mixer with stirring for one hour. The mixture was then injection molded to form the injection molded test specimens (whose sizes are 48 mm×86 mm×3 mm) using K50-C produced by Kawaguchi Steel K.K. and the cylinder temperature was set to 250° C. Mold temperature was 60° C. Good and uniformly black appearance and surface gloss without color shading of the specimens were observed.

formula [e]:

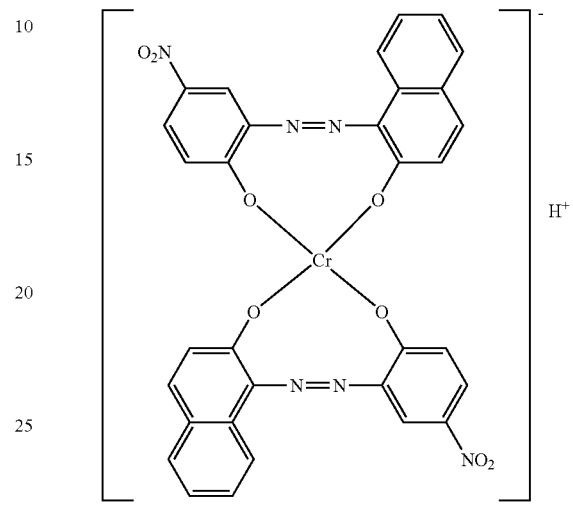

Test Procedures (1) Transmission Properties

Transmittance (T) in the range of 400 nm to 1200 nm of the test plates with laser beams having respective wavelengths of 940 nm (Semiconductor laser) and 1064 nm (YAG laser) was measured using a U-3410 spectrometer produced by Hitachi with 60ϕ sphere photometer for wavelength from ultraviolet to near-infrared. The ratio (TA) of transmission with 940 nm: transmission with 1064 nm and the ratio (TB) of transmission with 940 nm: transmission of natural resin are determined and compared between the examples.

(2) Appearance and Surface Gloss

Appearance of the test plates were evaluated by measuring Reflection Density (OD) of the test plates by Reflection Density meter TR-927 produced by Macbeth. Test plates having higher OD values are judged to have better surface smoothness and rich in gloss.

(3) Light Resistance

Each test plate was exposed to Xenon Weather Meter (produced by Toyo Seiki K.K., trade name: AtlasCI-4000) for 150 hours according to the following conditions. The amount of color fading and discoloration ΔE between "before" and "after" light irradiation was determined and measured using a colorimeter (produced by Juki, trade name: JP 7000).

| Conditions of Light Resistance Test Procedure | |
|---|---|
| Radial illumination (W/m²)(E) | 60 |
| Black standard temperature (° C.) | 83 |
| Rain test | N |
| Chamber temparture (° C.) | 55 |
| Moisture (%) | 50 |

The test plate having greater ΔE are judged to have greater discoloring and fading.

(4) Thermal Resistance

The amount of color fading and discoloration ΔE between "before" and "after" each test plate being placed and kept in an oven at 160° C. for 15 days was determined and measured using a colorimeter (produced by Juki, trade name: JP 7000).

(5) Moisture Resistance

The amount of color fading and discoloration ΔE between "before" and "after" each test plate being placed and kept in a thermoregulator at 80° C. (a humidity was 95%) for one week was determined and measured using a colorimeter (produced by Juki, trade name: JP 7000).

(6) TG (Thermogravimetric Analyzers)/DTA (Differential Thermal Analyzers)

TG and DTA of each test colorant powder were measured using TG/DTA analyzers (produced by Seiko Instrument, trade name:SII EXSTAR 6000) in a heating furnace that air is introduced into at 200 ml/min, of which temperature is raised from 30 to 55° C. at 10° C./min then when reached to at 550° C. for 28 minutes.

(7) Solubility Resistance in Organic Solvents

The amount of color fading and discoloration ΔE between before and after each test plate being immersed in ethyleneglycole and made airtight, then kept in thermoregulator at 40° C. for 48 hours was determined and measured using a calorimeter (produced by Juki, tradename: JP7000).

The test plate having greater E are judged to have greater discoloring and fading.

The results are set forth in the following Table 7.

with white cotton cloth and color change of the cotton appearance was visually examined. The results are shown in Table 8.

TABLE 8

|  | Example A | Comparative Example D |
|---|---|---|
| Cotton Appearance | No change | Colored to deep green |

Example G 14 kg of Nylon 6 Zytel® pellets (available from E.I. DuPont de Nemours and Co., under the product name ZYTEL® 7301), 8.8 grams of CuI, 100 grams of aluminum distearate, and 6 kg of fiberglass (TP57, available from Nippon Sheet Glass Co., Ltd.) were mixed and extruded on the twin-screw extruder (ZSK-40 of W&P).

5 kg of the obtained pellets were dried in a dehumidified dryer set at 80° C. for more than 4 hours and mixed with 10 grams of a dye mixture of the amine salt of anthraquinone dye of formula [I-21] (6.6 grams), perinone red dye of the formula [I-3] used in Example A (2.3 grams) and anthraquinone yellow dye of the formula [a] used in Example A (1.1 grams).

The dye-mixed pellets above were then molded into the test pieces according to the ISO3167 on Toshiba IS 170FIII molding machine, with cylinder temperature set at 260° C. and mold temperature at 80° C., and the test pieces of 60 mm×18 mm×1.5 mm on Sumitomo 75T molding machine, with cylinder temperature set at 260° C. and mold temperature at 80° C.

TABLE 7

|  |  | Example A | Example B | Example C | Comparative Example D | Comparative Example E | Comparative Example F |
|---|---|---|---|---|---|---|---|
| Transmission | TA | 0.96 | 0.95 | 0.95 | 0.98 | 0.83 | 0.72 |
|  | TB | 1.00 | 1.02 | 1.02 | 0.98 | 0.78 | 0.71 |
| OD |  | 2.47 | 2.49 | 2.45 | 2.51 | 2.49 | 2.43 |
| Light Resistance ΔE |  | 1.12 | 0.98 | 1.18 | 1.08 | 1.05 | 0.89 |
| Thermal Resistance ΔE |  | 0.61 | 0.64 | 0.62 | 1.29 | 1.12 | 0.35 |
| Solubility Resistance ΔE | Test Plate | 0.34 | 0.47 | 0.40 | 0.93 | 0.81 | 0.28 |
|  | Solvents | 0.61 | 0.08 | 0.65 | 1.59 | 1.06 | 0.32 |
| Moisture Resistance ΔE |  | 0.16 | 0.17 | 0.09 | 1.53 | 0.71 | 0.24 |
| TG/DTA |  |  |  |  |  |  |  |
| Exothermic peak (° C.)/ |  | 346.5, 506.2/ | 346.9/ | 315.1/ | 378.6/ | none/ | none/ |
| Endothermic peak (° C.) |  | none | none | none | 181.1 | 193.7 | 293.7 |

This testing demonstrates that Examples A-C showed as high transmittance as a natural color resin at a main wavelength in infra-red region (800 nm to 1200 nm), compared with Comparative Example F containing monoazo complex dye. The appearance, surface gloss and light resistance showed no deterioration in Examples A-C. In Examples A-C, no discoloring and fading after being exposured to heating was shown and thermal, solubility and moisture resistances were much better than Comparative Example D and E containing a neutral anthraquinone. No endothermic peak in test colorant powder Examples A-C was in the range of 200° C. to 300° C. and there is no adverse effect on thermoplastic resin due to addition of colorants during molding thereof.

(8) Blooming Resistance

The molded plates obtained as Example A and Comparative Example D were placed in an oven set at 60 deg. C. with 95% relative humidity for 1 week. Then the plates were wiped Comparative Example H 14 kg of Nylon 6 Zytel® pellets (available from E.I. DuPont de Nemours and Co., under the product name ZYTEL® 7301), 8.8 grams of CuI, 100 grams of aluminum distearate, and 6 kg of fiberglass (TP57, available from Nippon Sheet Glass Co., Ltd.) were mixed and extruded on the twin-screw extruder (ZSK-40 of W&P).

5 kg of the obtained pellets were dried in a dehumidified dryer set at 80° C. for more than 4 hours and mixed with 28 grams of nigrosine dye.

The dye-mixed pellets above were then molded into the test pieces according to the ISO3167 on Toshiba IS 170FIII molding machine, with cylinder temperature set at 260° C. and mold temperature at 80° C., and the test pieces of 60 mm×18 mm×1.5 mm on Sumitomo 75T molding machine, with cylinder temperature set at 260° C. and mold temperature at 80° C.

Comparative Example I 14 kg of Nylon 6 Zytel® pellets (available from E.I. DuPont de Nemours and Co., under the product name ZYTEL® 7301), 8.8 grams of CuI, 100 grams of aluminum distearate, and 6 kg of fiberglass (TP57, available from Nippon Sheet Glass Co., Ltd.) were mixed and extruded on the twin-screw extruder (ZSK-40 of W&P).

5 kg of the obtained pellets were dried in a dehumidified dryer set at 80° C. for more than 4 hours and mixed with 5 grams of carbon black and 28 grams of nigrosine dye.

The dye-mixed pellets above were then molded into the test pieces according to the ISO3167 on Toshiba IS 170FIII molding machine, with cylinder temperature set at 260° C. and mold temperature at 80° C., and the test pieces of 60 mm×18 mm×1.5 mm on Sumitomo 75T molding machine, with cylinder temperature set at 260° C. and mold temperature at 80° C.

(9) Tensile Properties and Heat Aging

Tensile strength and elongation were measured in Table 9 according to ISO527 after molding and after heat aging at 150° C. for 1000 hours. Test piece appearance was also observed.

TABLE 9

| | | Example G | Comparative Example H | Comparative Example I |
|---|---|---|---|---|
| After Molding | Tensile Strength (MPa) | 183 | 171 | 190 |
| | Elongation (%) | 3.6 | 3.4 | 3.8 |
| After Aging | Tensile Strength (MPa) | 191 | 181 | 155 |
| | Elongation(%) | 3.1 | 3.2 | 2.1 |
| | Appearance | Black | Dark brown | Black |

(10) Laser Welding Test

Figure 3:
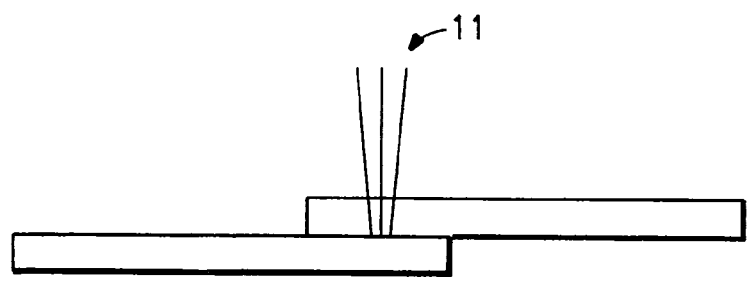
FIG. 3 is a side view of articles positioned for a laser welding test.
Figure 4:
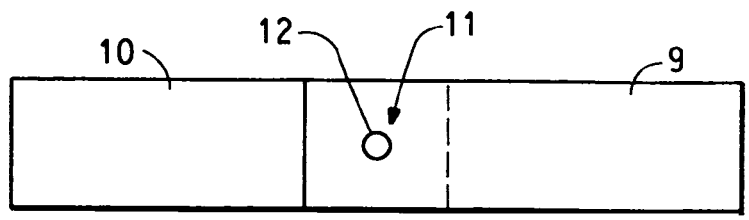
FIG. 4 is a top view of articles positioned for a laser welding test.

The 60 mm×18 mm×1.5 mm test pieces were placed so that 20 mm of each be overlapped. The overlapped area was irradiated with a diode laser (SDL-FD25, 820 nm continuous) set at 4 W with 3 mm diameter for 10 seconds. (See FIGS. 3&4). See FIGS. 3 and 4 depicting the arrangement of upper test piece 9 and lower test piece 10 for this test. The laser 11 is focused in the area 12 and the test pieces 9 and 10 are thereby joined together. FIGS. 3-6 illustrate preparation of laser welding test and how to carry out the laser welding tests.

TABLE 10

| Upper test piece | Example G | Comparative Example H |
|---|---|---|
| Lower test piece | Comparative Example I | Comparative Example I |
| Welding results | Good adhesion | Could not adhere |

Figure 5:
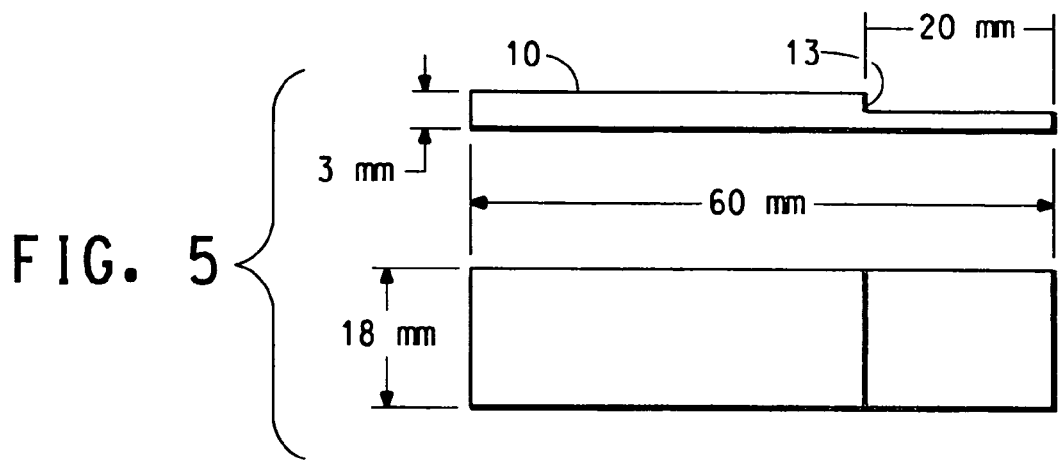
FIG. 5 is both a side view and a top view of a test piece used in the laser welding test.
Figure 6:
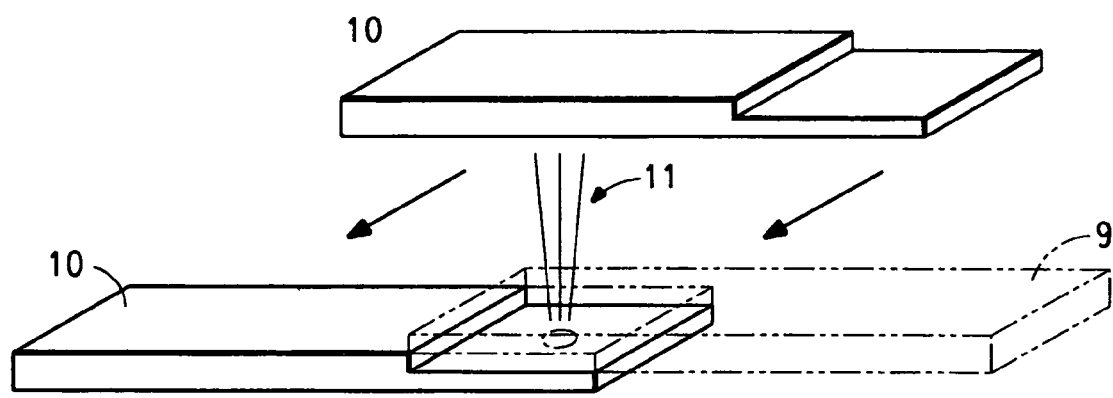
FIG. 6 is a side view of the test piece moved into position for the laser welding test.

A variation of the test described immediately above is shown in FIGS. 5 and 6. Each of the upper test piece 9 and lower test piece 10 have a notch 13 which is 20 mm in length. When the test pieces 9 and 10 are joined together, a smooth surface is thereby created, which is subjected to the laser 11 as described above.

Example G exhibited good adhesion in laser welding with an opaque workpiece part for a laser beam, being made of thermoplastic resin containing carbon black. The mechanical properties after molding and aging showed no deterioration and appearance of thermoplastic resin was not changed even when a colorant was added.

Example J 400 grams of Nylon 66 ZYTEL 101 pellets (available from E.I. DuPont de Nemours and Co.) were dried under vacuum at 120° C., for more than 8 hours, then mixed with a mixture of amine salt of anthraquinone dye of formula [I-21] (0.53 g) with perinone red dye represented by the formula [IV-3] (0.18 g) and anthraquinone yellow dye represented by the formula [a] (0.09 g) in a stainless tumble mixer with stirring for one hour. The mixture was then injection molded to form the injection molded test specimens (whose sizes are 48 mm×86 mm×3 mm) using K50-C produced by Kawaguchi Steel K.K. and the cylinder temperature was set to 290° C. Mold temperature was 60° C. Good and uniformly black appearance and surface gloss without color shading of the specimens were observed.

Example K 400 grams of Nylon 66 ZYTEL 101 pellets (available from E.I. DuPont de Nemours and Co.) were dried under vacuum at 120° C., for more than 8 hours, then mixed with a mixture of amine salt of anthraquinone dye of the formula [II-8] (0.53 g) with perinone red dye represented by the formula [IV-3] (0.18 g) and anthraquinone yellow dye represented by the formula [a] (0.09 g) in a stainless tumble mixer with stirring for one hour. The mixture was then injection molded to form the injection molded test specimens (whose sizes are 48 mm×86 mm×3 mm) using K50-C produced by Kawaguchi Steel K.K. and the cylinder temperature was set to 290° C. Mold temperature was 60° C. Good and uniformly black appearance and surface gloss without color shading of the specimens were observed.

Comparative Example L 400 grams of Nylon 66 ZYTEL 101 pellets (available from E.I. DuPont de Nemours and Co.) were dried under vacuum at 120° C., for more than 8 hours, then mixed with a mixture of anthraquinone violet dye of the following formula [d] (0.68 g) with quinophthalone yellow dye represented by the formula [f] (0.12 g) in a stainless tumble mixer with stirring for one hour. The mixture was then injection molded to form the injection molded test specimens (whose sizes are 48 mm×86 mm×3 mm) using K50-C produced by Kawaguchi Steel K.K. and the cylinder temperature was set to 290° C. Mold temperature was 60° C. Good and uniformly black appearance and surface gloss without color shading of the specimens were observed.

formula [f]:

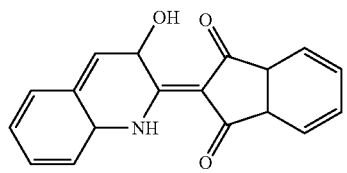

TABLE 11

| | | Example J | Example K | Comparative Example L |
|---|---|---|---|---|
| Transmission | TA | 0.94 | 0.94 | 0.93 |
| | TB | 0.95 | 0.96 | 0.91 |

TABLE 11-continued

|  | Example J | Example K | Comparative Example L |
|---|---|---|---|
| OD | 2.40 | 2.41 | 2.32 |
| Thermal Resistance ΔE | 0.51 | 0.47 | 1.30 |
| Moisture Resistance ΔE | 0.14 | 0.36 | 1.02 |
| TG/DTA |  |  |  |
| Exothermic peak (° C.)/ | 346.5, 506.2/ | 346.9/ | 320.9/ |
| Endothermic peak (° C.) | none | none | 179.5 |

This testing demonstrates that Examples J and K showed high transmittance at a main wavelength in infra-red region (800 nm to 1200 nm) and good surface gloss. In thermal and moisture resistances, Examples J and K were much better than Comparative Example L containing a neutral anthraquinone.

Example M 400 grams of glass reinforced polyester pellets (prepared from terephthalic acid and ethylene glycol the intrinsic viscosity of which is 0.85 when measured at 25° C. as a 1% solution in a mixed solution of phenol and dichlorobenzene with the weight ratio of 1/1 and containing 30 wt % chopped strand glass fibers 187H produced by Nippon Electric Glass Co., Ltd. based on a total weight of the polyester resin composition) were dried under vacuum at 120° C., for more than 8 hours, then mixed with a mixture of amine salt of anthraquinone dye of formula [I-11] (0.50 g), amine salt of anthraquinone dye represented by the formula [I-14] (0.40 g) and amine salt of anthrapyridone dye represented by the formula [VI-2] (0.10 g) in a stainless tumble mixer with stirring for one hour. The mixture was then injection molded to form the injection molded test specimens (whose sizes are 48 mm×86 mm×3 mm) using K50-C produced by Kawaguchi Steel K.K. and the cylinder temperature was set to 290° C. Mold temperature was 60° C. Good and uniformly black appearance and surface gloss without color shading of the specimens were observed. See Table 12.

Comparative Example N 400 grams of glass reinforced polyester pellets of Example M were dried under vacuum at 120° C., for more than 8 hours, then mixed with a mixture of anthraquinone violet dye of the following formula [d] (0.68 g) with quinophthalone yellow dye represented by the formula [f] (0.12 g) in a stainless tumble mixer with stirring for one hour. The mixture was then injection molded to form the injection molded test specimens (whose sizes are 48 mm×86 mm×3 mm) using K50-C produced by Kawaguchi Steel K.K. and the cylinder temperature was set to 290° C. Mold temperature was 60° C. Good and uniformly black appearance and surface gloss without color shading of the specimens were observed. See Table 12

TABLE 12

|  |  | Example M | Comparative Example N |
|---|---|---|---|
| Transmission | TA | 0.92 | 0.92 |
|  | TB | 0.85 | 0.89 |
| OD |  | 1.90 | 1.86 |
| Moisture Resistance ΔE |  | 0.61 | 3.58 |
| TG/DTA |  |  |  |
| Exothermic peak (° C.)/ |  | 337.0/ | 320.9/ |
| Endothermic peak (° C.) |  | none | 179.5 |

This testing demonstrates that in moisture resistances Examples M were much better than Comparative Example N containing a neutral anthraquinone. If a colored resin composition as like Comparative Example N is used in rich humid atmosphere, it has high possibility to discolor.

Example O-Example R, Comparative Example S-T

Fiberglass reinforced nylon 6 (Zytel®73G30L, available from E.I. DuPont de Nemours and Co.) and dyes were dry-blended with the amount described in table 13. The blended material was molded into two types of test pieces: one for mechanical properties, and another for laser welding. Test pieces for mechanical properties were molded according to the ISO3167 on the Toshiba IS 170III injection molding machine, with cylinder temperature set at 260° C. and mold temperature at 80° C. Test pieces for laser welding, with dimensions illustrated as in FIG. 5, were molded on the Sumitomo Juki 75T injection molding machine, with cylinder temperature set at 250° C. and mold temperature at 80° C.

Tensile strength and elongation were measured according to ISO527 and notched Charpy impact strength was measured according to ISO179.

Laser welding was conducted using two pieces of the test pieces described above, combined as illustrated in FIG. 6. Each Example from O to R and Comparative Example S was used as Upper test piece and Comparative Example T was used as Lower test piece. Diode laser (wavelength 940 nm, manufactured by Rofin-Sinar Laser GmbH) was irradiated with various power and speed, with 3 mm diameter.

Tensile strength of the welded test pieces were measured on Autograph (manufactured by Shimazu Seisakusho) by pulling apart at 5 mm/minute and its maximum load was recorded

TABLE 13

|  | Example O | Example P | Example Q | Example R | Comp. Ex. S | Comp. Ex. T |
|---|---|---|---|---|---|---|
| 73G30L kg | 4.9925 | 4.9925 | 4.9925 | 4.9925 | 5 | 4.99 |
| Amine salt of anthraquinone dye [I-21] | 5.00 g | 5.00 g |  |  |  |  |
| Amine salt of anthraquinone dye [I-23] |  |  | 5.00 g |  |  |  |
| Amine salt of anthraquinone dye [I-13] |  |  |  | 5.63 g |  |  |
| Monoazo complex red dye [V-2] | 1.67 g |  |  |  |  |  |
| Monoazo complex orange dye [V-3] | 0.83 g |  |  |  |  |  |
| Perinone red dye [IV-3] |  | 1.67 g | 2.50 g | 1.88 g |  |  |

TABLE 13-continued

|  | Example O | Example P | Example Q | Example R | Comp. Ex. S | Comp. Ex. T |
|---|---|---|---|---|---|---|
| Yellow dye [a] |  | 0.83 g |  |  |  |  |
| Carbon black |  |  |  |  |  | 10 g |
| Tensile strength MPa | 175 | 170 | 176 | 174 | 179 | 185 |
| Elongation % | 3.8 | 3.7 | 3.9 | 3.8 | 3.5 | 3.4 |
| Notched Charpy KJ/m$^2$ | 12.2 | 12.4 | 12.4 | 12.4 | 13.4 | 12.2 |
| Laser Welding at 50 W |  |  |  |  |  |  |
| 2.5 m/min Kgf | 195 | 193 | 197 | 199 | 203 | — |
| 5 m/min Kgf | 194 | 186 | 182 | 189 | 182 | — |
| 10 m/min Kgf | 99 | 99 | 132 | — | 134 | — |

Example U-Example Z, Comparative Example AA-AB

Fiberglass reinforced nylon 66 (Zytel®70G33HS1L, available from E.I. DuPont de Nemours and Co.) and dyes were dry-blended with the amount described in table 13. The blended material was molded into two types of test pieces: one for mechanical properties, and another for laser welding. Test pieces for mechanical properties were molded according to the ISO3167 on the Toshiba IS 170FIII injection molding machine, with cylinder temperature set at 280° C. and mold temperature at 80° C.

Test pieces for laser welding, with dimensions illustrated as FIG. 5, were molded on the Sumitomo Juki 75T injection molding machine, with cylinder temperature set at 270° C. and mold temperature set at 80° C.

Tensile strength and elongation were measured according to ISO527 and notched Charpy impact strength was measured according to ISO179.

Laser welding was conducted using two pieces of the test pieces described above, combined as illustrated in FIG. 6. Each Example from U to Z and Comparative Example AA was used as Upper test piece and Comparative Example AB was used as Lower test piece. Diode laser (wavelength 940 nm, manufactured by Rofin-Sinar Laser GmbH) was irradiated with various power and speed, with 3 mm diameter.

Tensile strength of the welded test pieces were measured on Autograph (manufactured by Shimazu Seisakusho) by pulling apart at 5 mm/minute and its maximum load was recorded.

TABLE 14

|  | Example U | Example V | Example W | Example X | Example Y | Example Z | Comp. Ex. AA | Comp. Ex. AB |
|---|---|---|---|---|---|---|---|---|
| 70G33HSIL kg | 4.9925 | 4.9925 | 4.9925 | 4.9925 | 4.9925 | 4.9925 | 5 | 4.99 |
| Amine salt of anthraquinone dye [I-21] | 5.00 g | 5.00 g |  |  |  |  |  |  |
| Amine salt of anthraquinone dye [I-23] |  |  | 5.00 g |  |  |  |  |  |
| Amine salt of anthraquinone dye [I-13] |  |  |  | 5.63 g |  |  |  |  |
| Amine salt of anthraquinone dye [II-8] |  |  |  |  | 5.00 g |  |  |  |
| Amine salt of anthraquinone dye [II-7] |  |  |  |  |  | 5.00 g |  |  |
| Monoazo complex red dye [V-2] | 1.67 g |  |  |  |  |  |  |  |
| Monoazo complex orange dye [V-3] | 0.83 g |  |  |  |  |  |  |  |
| Perinone red dye [IV-3] |  | 1.67 g | 2.50 g | 1.88 g | 1.67 g | 1.67 g |  |  |
| Yellow dye [a] |  | 0.83 g |  |  | 0.83 g | 0.83 g |  |  |
| Carbon black |  |  |  |  |  |  |  | 10 g |
| Tensile strength MPa | 198 | 203 | 197 | 197 | 197 | 194 | 206 | 207 |
| Elongation % | 3.5 | 3.3 | 3.4 | 3.5 | 3.5 | 3.4 | 3.6 | 3.2 |
| Notched Charpy kJ/m$^2$ | 12.7 | 12.4 | 12.8 | 12.6 | 12.7 | 12.5 | 12.8 | 11.9 |
| Laser Welding at 80 W |  |  |  |  |  |  |  |  |
| 2.5 m/min kgf | 82 | 57 | 96 | 86 | 204 | 177 | 95 | — |
| 5 m/min kgf | 180 | 193 | 184 | 181 | 192 | 196 | 184 | — |
| 10 m/min kgf | 182 | 113 | 185 | 167 | 89 | — | 172 | — |

Example AC, Comparative Example AD-AE

Fiberglass reinforced polyester pellets of Example M and dyes were dry-blended with the amount described in table 14. The blended material was molded into two types of test pieces: one for mechanical properties, and another for laser welding.

Test pieces for mechanical properties were molded according to the ISO3167 on the Toshiba IS 170FIII injection molding machine, with cylinder temperature set at 280° C. and mold temperature at 60° C. Test pieces for laser welding, with dimensions illustrated as FIG. 5, were molded on the Sumitomo Juki 75T injection molding machine, with cylinder temperature set at 280° C. and mold temperature set at 60° C.

Tensile strength and elongation were measured according to ISO527 and notched Charpy impact strength was measured according to ISO 179.

Laser welding was conducted using two pieces of the test pieces described above, combined as illustrated in FIG. 6. Example AC and Comparative Example AD was used as Upper test piece and Comparative Example AE was used as Lower test piece. A diode laser (wavelength 940 nm, manufactured by Rofin-Sinar Laser GmbH) was irradiated with various power and speed, with 3 mm diameter. Tensile strength of the welded test pieces were measured on Autograph (manufactured by Shimazu Seisakusho) by pulling apart at 5 mm/minute and its maximum load was recorded.

TABLE 15

|  | Example AC | Comp. Ex. AD | Comp. Ex. AE |
|---|---|---|---|
| Polyester pellets kg | 5.0 | 5.0 | 5.0 |
| Amine salt of anthraquinone dye [I-11] | 6.25 | | |
| Amine salt of anthraquinone dye [I-14] | 5.0 | | |
| Amine salt of anthraquinone dye [VI-2] | 1.25 | | |
| Carbon black | | | 22.5 |
| Tensile strength MPa | 139 | 140 | 138 |
| Elongation % | 3.7 | 3.2 | 3.4 |
| Notched Charpy KJ/m$^2$ | 11 | 11 | 11 |
| Laser Welding at 50 W 5 m/min Kgf | 149 | 145 | — |

Example AC is same compositon as that in Example M

Comp. Ex. AD comprises natural colored glass reinforced polyester used in Example M or N.

Comp. Ex. AE comprises black colored glass reinforced polyester used in Example M or N by adding carbon black to the natural colored polyester.

The invention claimed is:
1. A laser welded article, comprising:
a first molded article transparent to a laser beam, comprising a thermoplastic resin and a laser-transmitting black colorant comprising an amine salt of anthraquinone dye; and
a second molded article opaque to the laser beam, being laser welded to the first molded article.
2. A laser welded article according to claim 1, wherein the amine salt of anthraquinone dye is formula [I] or formula [II], wherein formula [I] is:

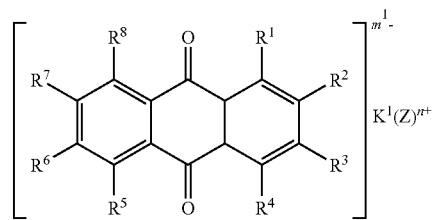

wherein $R^1$ to $R^8$, which may be the same or different, are independently selected from the group consisting of H, alkyl, aryl, alkenyl, alkoxy, amino, hydroxy, halogen atom, acyl, acyloxy, acylamide, acyl-N-alkylamide, carboxyl, alkoxycarbonyl, cyclohexylamide, sulfonyl, formula [I-a], or —Y—W, and at least one of $R^1$ to $R^8$ is of formula [I-a]; wherein Y is S, O, or NH; wherein W is selected from alkyl group, alkenyl group, and aryl group; wherein (Z)n+ represents ammonium ion or a cation derived from an organic amine compounds or a basic dye; wherein n is 1 or 2, m1 is an integer from 1 to 4 and K1 is the ratio of m1/n;

and wherein formula [I-a] is:

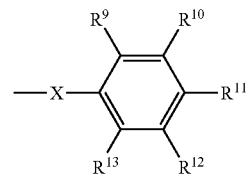

wherein X is O or NH, and $R^9$ to $R^{13}$, which may be the same or different, are independently selected from the group consisting of H, alkyl, aryl, alkenyl, alkoxy, amino, N-alkylamide, N-arylamide, hydroxy, halogen atom, acyl, acyloxy, acylamide, acyl-N-alkylamide, carboxyl, alkoxycarbonyl, or sulfonyl; wherein at least one of $R^1$ to $R^8$ and $R^9$ to $R^{13}$ is sulfonyl; and wherein formula [II] is:

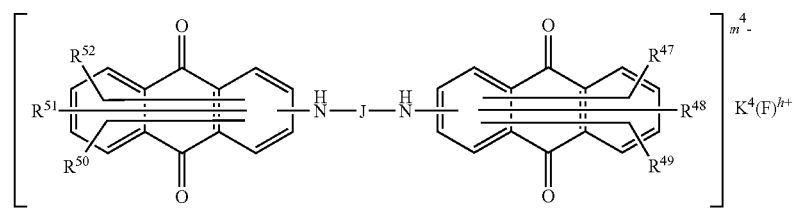

wherein $R^{47}$ to $R^{52}$, which may be the same or different, are independently selected from the group consisting of H, alkyl, aryl, alkenyl, alkoxy, amino, N-alkylamide, N-arylamide, hydroxy, halogen atom, acyl, acyloxy, acylamide, acyl-N-alkylamide, carboxyl, alkoxycarbonyl, or sulfonyl; and at least one of $R^{47}$ to $R^{52}$ is sulfonyl; and formula J in formula [III] is selected from formula [II-a] or formula [II-b] and binds two anthraquinone, wherein formula [II-a] is:

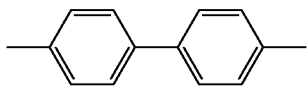

and formula [II-b] is:

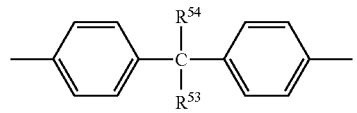

wherein $R^{53}$ to $R^{54}$, which may be the same or different, are independently selected from the group consisting of alkyl (having 1 to 8 carbon atoms) or hydrogen; and wherein (F)h+ represents ammonium ion or a cation derived from an organic amino compounds or a basic dye wherein h is 1 or 2, m4 is an integer from 1 to 4 and K4 is the ratio of m4/h.

3. A laser welded article according to claim 2, wherein the amine salt of anthraquinone dye is formula [I], wherein $R^2$, $R^3$, $R^5$, $R^6$, $R^7$, and $R^8$ are H; $R^1$ is of formula [I-a] wherein X is NH; $R^9$, $R^{11}$, and $R^{13}$ are $CH_3$; $R^{12}$ is $-SO_3^-$, $R^{10}$ is H; and wherein $(Z)^{n+}$ is $H_3N^+(CH_2)_6NH_2$ wherein n is 1, m1 is an integer 2; K1 is 2.

4. A laser welded article according to claim 1, wherein the first molded article further comprises a second dye.

5. A laser welded article according to claim 4, wherein said second dyes is a perinone dye of formula [IV]:

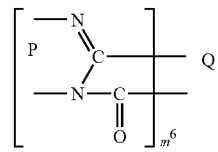

wherein P is formula [IV-b] and Q is formula [IV-c]:

formula [IV-b]:

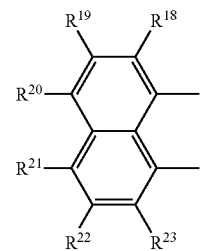

formula [IV-c]:

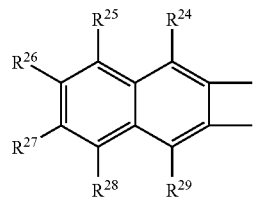

and wherein $R^{18}$ to $R^{29}$ is H, and $m^6$ is equal to 1.

* * * * *